(12) United States Patent
Kuwahara et al.

(10) Patent No.: US 6,583,895 B1
(45) Date of Patent: Jun. 24, 2003

(54) IMAGE PROCESSING METHOD AND IMAGE PROCESSING APPARATUS

(75) Inventors: Yasuhiro Kuwahara, Osaka-fu (JP); Akio Kojima, Osaka-fu (JP); Tatsumi Watanabe, Kyoto-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/379,626

(22) Filed: Aug. 24, 1999

(30) Foreign Application Priority Data

Aug. 24, 1998 (JP) .......................................... 10-237105

(51) Int. Cl.[7] .............................................. H04N 1/024
(52) U.S. Cl. ...................................... 358/473; 358/444
(58) Field of Search .............................. 358/473, 472, 358/471, 444; 382/313; 250/208.1, 557

(56) References Cited

U.S. PATENT DOCUMENTS

| 5,729,008 | A | * | 3/1998 | Blalock et al. | 250/208.1 |
| 5,825,044 | A | * | 10/1998 | Allen et al. | 250/557 |
| 5,930,411 | A | * | 7/1999 | Kojima et al. | 382/312 |
| 6,005,681 | A | * | 12/1999 | Pollard | 358/473 |
| 6,249,360 | B1 | * | 6/2001 | Pollard et al. | 358/473 |

FOREIGN PATENT DOCUMENTS

JP         8-241393        9/1996

* cited by examiner

Primary Examiner—Cheukfan Lee
(74) Attorney, Agent, or Firm—McDermott, Will & Emery

(57) ABSTRACT

The present invention relates to an image reading method and apparatus for regenerating on the image data storage image data read by an image reading apparatus such as a hand scanner. The object of the invention is to perform the mapping with high quality in a high speed without using a scanning flag representing whether the mapping has been already performed or not by using an image data reading apparatus able to perform the scanning freely in any direction. The invention is carried out by the following steps: first the position information generating device 2 generates position information of the image reading sensor 51 in accordance with the moving amount detected by the moving amount detecting unit 1, the scanning direction detecting unit 3 detects a scanning direction in accordance with the position information thus obtained, and the boundary detecting unit 4 generating a boundary within the mapping area in accordance with the scanning direction and the position information. And next, the boundary comparing unit 5 compares the boundary and the position information of pixels obtained by each elements of the image reading sensor 51 in accordance with the scanning direction, if the pixels are existed outside the boundary, the mapping unit 8 is given the compared results so as to perform the mapping. And the mapping unit 8 performs the mapping of the image data read by the image reading unit 6 on the image data storage in accordance with the position information. At this time, the mapping processing is controlled by the compared result with the boundary.

30 Claims, 20 Drawing Sheets

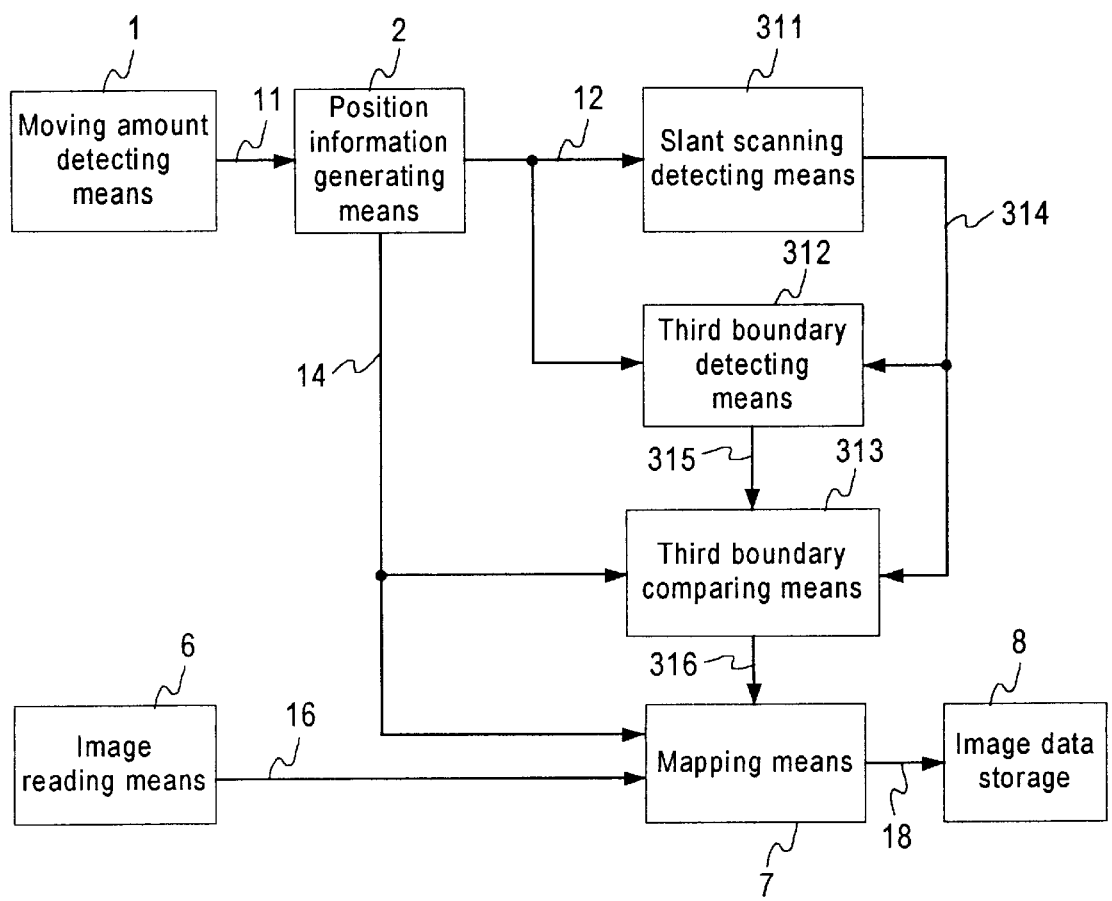
Fig. 24
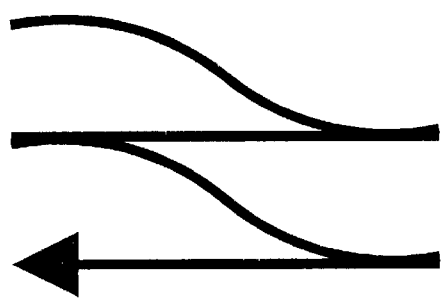
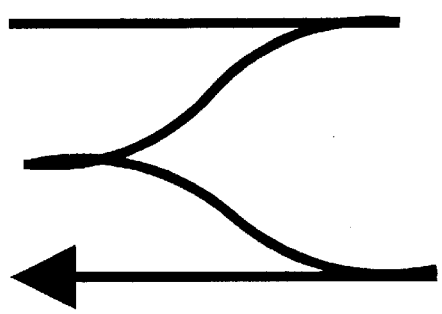
Fig. 25(a)    Fig. 25(b)

| Gradation | Multi-valued data |
|---|---|
| 0 | 0 |
| 1 | 1 |
| 2 | 2 |
| 3 | 3 |
| ... | ... |
| 1 2 6 | 1 2 6 |
| 1 2 7 | 1 2 7 |
| 1 2 8 | 1 2 8 |
| 1 2 9 | 1 2 9 |
| ... | ... |
| 2 5 4 | 2 5 4 |
| 2 5 5 | F l g |

Fig. 33

IMAGE PROCESSING METHOD AND IMAGE PROCESSING APPARATUS

BACKGROUND OF THE INVENTION

1. Field of the Invention

This invention relate to an image reading method and apparatus for regenerating image data read by an image reading apparatus such as a hand-scanner on an image storage means. More specially, this invention relates to an image data reading apparatus and method able to perform a scanning freely, and to regenerate an image data with high quality in a high speed.

2. Description of the Prior Art

An image scanning apparatus used for reading image data in a flatbed type is generally arranged that an image reading sensor set a plurality of reading elements in a line moves in a specific speed in a vertical direction against the elements arraying direction of the image reading sensor. Under the arrangement, each element scans with a pulse of specific period in a line reading direction (a main scanning) and also scans in a moving direction (a sub scanning), as a result an image data can be acquired from each element. Furthermore, the image data thus obtained is synchronized with the acquisition timing and written into an image data storage means (hereinafter the processing is represented as "map").

In the above constitution acquisition positions of the image data may be arrayed equally on two axes which make a right angle, that is, in the main scanning direction and the sub scanning direction. Moreover in this case, since each synchronous signal of the main scanning direction and the sub scanning direction synchronizes with the position signals sent to the image storage means, each acquisition position of the image data can be corresponded at one-to-one to each pixel mapping position in the image storage means. Therefore, it can be easy to acquire the image data with high quality.

Besides the image scanning apparatus of the above flatbed type, the applicant of the present invention developed an image reading apparatus of a free scanning type (hereinafter represented as a free scanning apparatus) which is disclosed in the Japanese laid-open publication No. H08-241393. It is possible for the free scanning apparatus to acquire an image data by operating the image reading sensor over an original by hand.

FIG. 28 shows the first step of the reading procedure for an original using the free scanning apparatus. The free scanning apparatus is provided with a wheel 52 and 53 outside each end of the image reading sensor 51. The free scanning apparatus can read the image data not only in a straight line direction shown as the scanning 341, but also in a curvilinear direction that the wheels rotate in reverse, which is shown as the scanning 342.

Namely, it is possible to read the ABCD area by the scanning 341, and the BEFC area by the scanning 342. The BEGC area, which is read out above the other at this time, is represented as an overlapped area hereinafter.

And the direction of a straight line AD, which the reading elements are arrayed on and connects the ends of the image reading sensor 51, is defined as a main scanning direction, while the wheel advancing direction is as a sub scanning direction. Accordingly, the sub scanning direction of the free scanning apparatus does not become a fixed linear direction as shown in the image scanning apparatus of flatbed type.

Therefore, in order to clear the coordinates, a position at which the image reading sensor 51 starts to reading is defined as a reference position, the reading elements arraying direction of the image reading sensor 51 at the reference position is defined as a Y axis, and an axis which is vertical to the Y axis is defined as a X axis. By operating the free scanning apparatus freely, it is possible to read an image data of an arbitrary position for the width of the image reading sensor. A right direction from the reference position is defined as a X positive direction, a downward direction from the reference position is defined as a Y positive direction, and thereby the explanation will be given as follows. FIG. 29 shows the second step of the reading procedure for an original, and the EHJF area is read out by performing the scanning 345 after the scanning of the first step shown in FIG. 28.

When the free scanning apparatus as described above reads an image data by a return-back scanning the mapping errors are generated and exert an influence upon the picture quality of the image data Referring to FIGS. 30 and 31, the mapping errors will be explained hereinafter.

FIG. 30 shows an illustrated diagram indicating an example of the mapping errors. The white dot 351 represents a pixel position on the image data storage means to be mapped (that is called a mapped pixel position hereinafter), a black dot 352 represents a pixel position corresponding to each element on the image reading sensor 51, and an arrow 357 represents a sub scanning direction Here, if the read-out pixel position is coincident with the mapped pixel position, the mapping errors (the difference between the white dot position and the black dot position) will not occur.

However, it almost occurs in case of the free scanning that the read-out pixel position is not identical with the mapped pixel position, which is shown as the read-out positions 355 and 356. But if the scanning position is almost horizontal or almost vertical to the array of the mapped position as shown in FIG. 30, there is not so much deterioration of the picture quality because it occurs the mapping errors with very few difference between the read-out pixel position and the mapped pixel position at each element of the image reading sensor 51.

FIG. 31 is an explanatory diagram showing the other example of generating the mapping errors. In case of a scanning with a slant shown as an arrow 363, the difference between the read-out pixel position and the mapped pixel position becomes large at each element of the image reading sensor 51 and the mapping errors is generated sharply. Consequently the picture quality deteriorates radically.

Therefore, the image data of the ABCD area mapped at the time of the scanning 341 in FIG. 28 had better not to be overwritten by the image data of the BEFC area generated by the scanning 342 (a scanning in the X negative direction) after the turn-back There is a method which does not perform the mapping by the scanning 342 in the X negative direction, but in case that the scanning finishes at the scanning 342 in the X negative direction it occurs that the read-out image data are not be mapped. And as it exerts an influence upon the image synthesis, that method is not preferable.

In the conventional apparatus, the information that the mapping has already finished or not (called a scanning information hereinafter) is stored using a scanning flag as shown in FIG. 32 or one of gradations as shown in FIG. 33 (of which the initial status is represented by the gradation 255, accordingly in case of performing the mapping the gradation is one except 255). If the scanning flag stands or the gradation excluding a specific one is represented, the mapping has already finished. Accordingly, in case of the scanning 342 in the X negative direction, it can be arranged that the mapping in the overlapped area is not performed.

On the contrary, in case of the scanning 345 in X positive direction again as shown in FIG. 29, it is preferable to rewrite the GFC area shown in FIG. 28 because the picture quality gets better.

However, if the mapping in the X negative direction is restricted by determining to perform the mapping according to whether the scanning flag stands or the gradation is a specific one, the picture quality is improved. But it takes much time to read out the scanning information from the image data storage means (for instance, an image data memory), therefore there is a problem that the time for the mapping processing increases.

In general, since the mapping positions are not arranged consecutively on the image data memory, the access to the memory is a randam access. And in case of using SDRAM (Synchronous DRAM), the time for the reading of the scanning information is longer than that for the writing the scanning information into the memory because of the latency (the latency time for reading), which exerts many influence upon the whole time of the mapping processing.

The present invention is proposed to resolve the above problems, and has an object to provide an image reading method and apparatus able to perform the mapping processing with high quality in high speed without using the scanning information in the image storage means.

SUMMARY OF THE INVENTION

To achieve the above objects, the present invention adopts the following means.

This invention is provided with a free scanning apparatus (not shown) comprising an image reading sensor 51 on which a plurality of reading elements are set in an array. When the free scanning apparatus scans over an original in an arbitrary direction, image reading means 6 generates image data corresponding to said each reading elements in accordance with signals detected by a plurality of reading elements. Besides, according to a moving amount of the free scanning apparatus, position information generating means 2 calculates position information corresponding to said each image data. Said each image data is mapped in image data storage 8 according to the position information. Here, the position information corresponding to each reading elements of the image reading sensor 51 are identical substantially with one of image data obtained from each elements of the image reading sensor 51, that is, pixels.

First scanning direction detecting means 3 detects a scanning direction of the free scanning apparatus in accordance with the position information of both ends of the image reading sensor 51. And, where the read starting position represents a reference position, a reading elements arraying direction at the reference position is defined as a Y axis and a direction vertical to the Y axis as a X axis, in accordance with the scanning direction signals outputted from the first scanning direction detecting means 3 and the position information of one or both ends of the image reading sensor 51, when the free scanning apparatus scans in the X positive direction for one section, first boundary detecting means 4 generates a boundary vertical to at least either one of the X axis or the Y axis within the mapping area.

And the reference position can be reset arbitrarily on the way of the scanning.

And first boundary comparing means 5, when the free scanning apparatus scans in the X negative direction in accordance with the scanning direction signals, said means compares boundary signals outputted the first boundary detecting means 4 and the position information of the image reading sensor 51. Mapping means, when the image data is mapped on the image data storage 8 in accordance with the position information of the image reading sensor 51, determines whether the mapping is performed or not in accordance with comparing signals outputted from the first boundary comparing means 5.

Namely, in the present invention, when the free scanning apparatus scans for a section in the X positive direction, a boundary vertical to at least either one of the X axis or the Y axis is generated within a mapping area in accordance with the position information of one or both ends of the image reading sensor generated by the position information generating means and when the free scanning apparatus scans in the X negative direction, only a part outside the boundary generated by the one section scanning is mapped.

Therefore it is not necessary to read a scanning flag or a specific gradation indicating whether the mapping has been performed or not, and it is possible to perform the mapping with high quality in high speed.

In this case, it may be arranged that the scanning in the X negative direction includes that one end of the image reading sensor moves in the X positive direction and the other end moves in the X negative direction. Thereby, it is possible to determine accurately the scanning direction in case of the rotational scanning of the reading sensor.

And to achieve the above objects there is another method arranged as shown a block diagram in FIG. 17. In this apparatus, the components of the image reading means 6, the position information generating means 2 and the image data storage 8 are the same as in the first apparatus, but forward direction detecting means 232 determines a forward direction of the free scanning apparatus in accordance with the position information of both ends of the image reading sensor 51 for a specific section, second scanning direction detecting means 231 detects a scanning direction of the free scanning apparatus in accordance with the position information of both end of the image reading sensor 51 and forward direction signals outputted from the forward direction determining means 232.

Where a reading elements arraying direction of the image reading sensor 51 at the reference position is defined as a Y axis and a direction vertical to the Y axis as a X axis, in accordance with the forward direction signals, scanning direction signals outputted from the second scanning direction detecting means 231 and the position information of both ends of the image reading sensor 51, if the scanning apparatus is determined to move for one section in the forward direction, second boundary detecting means 233 generates a boundary vertical to at least one of the X axis or the Y axis within the mapping area.

And second boundary comparing means 234, if the free scanning apparatus is determined to move in reverse direction according to the scanning direction signals, said means compares boundary signals outputted from the second boundary detecting means 233 and the position information of the image reading sensor 51. Mapping means, when the image data is mapped on the image data storage 8 in accordance with the position information of the image reading sensor 51, determines whether the mapping has been performed or not according to comparing signals outputted from the second boundary comparing means 234.

In the present invention, the forward direction of the scanning is determined in accordance with the moving amount for specific sections in the X axis direction, and when the free scanning apparatus scans in the forward direction for a section, a boundary vertical to at least either one of the X axis or the Y axis is generated within a mapping area in accordance with the position information of one or both ends of the image reading sensor, and when the free scanning apparatus scans in the reverse direction only a part outside the boundary generated by said one section scanning is mapped, that is, it is possible to carry out the mapping even if the linear scanning is performed in either direction right or left from the reference position And at this time, the scanning in reverse direction to the X axis may be arranged to include the moving of one end of the image reading sensor 51 in the X positive direction and the moving of the other end of the image reading sensor 51 in the X negative direction. Therefore, it is possible to determine accurately the scanning direction in case of the rotational scanning of the reading sensor.

And FIG. 24 shows the third image reading apparatus of the present invention wherein the image reading means 6, the position information generating means 2 and the image data storage are the same as in the first and the second apparatus. In this apparatus, slant scanning detecting means 311 detects the slant against the reference position of the free scanning apparatus according to the position information of both ends of the image reading sensor 51. Where a reading elements arraying direction at the reference position is defined as a Y axis and a direction vertical to the Y axis as a X axis, third boundary detecting means 312 detects a slant of the free scanning apparatus against the reference position in accordance with the position information of both ends of the image reading sensor 51 and slant scanning signals outputted from the slant scanning detecting means 311, and if the slant value is under a specific value, said means generates a boundary vertical to at least one of the X axis or the Y axis within the mapping area for one section.

And third boundary comparing means 313 compares boundary signals outputted from the third boundary detecting means 312 and the position information of the image reading sensor 51 in accordance with the slant scanning signals. And the mapping means 7, when the image data is mapped in the image data storage according to the position information of the image reading sensor, determining whether the mapping is performed or not in accordance with comparing signals outputted from the third boundary comparing means 313.

Namely, in the present invention, the slant of the free scanning apparatus to the reference position is detected in accordance with the position information of both ends of the image reading sensor 51 at the time of the scanning of the free scanning apparatus. If the slant value is under the specific value, a boundary is generated in vertical to either one of the X axis or the Y axis within the mapping area for one section, and if the slant is over the specific value, only the part outside the boundary is to be mapped. Thereby, it is possible to carry out the mapping in case of the special scanning shown as in FIG. 25, and to regenerate the image data with high quality. In this case, when the slant of the free scanning apparatus is detected, the slant information is arranged to be generated in accordance with two threshold values, thereby the change of the boundary based on the slight slant can be avoided.

And it is arranged in each method and apparatus of the present invention that, in order to control the mapping in detail, only the parts outside the combined boundary generated by the scanning for a plural sections is to be mapped. In a result, the picture quality can be improved.

And the boundary may include a boundary which is generated in vertical to the Y axis in accordance with a minimum value of Y coordinate, within the scanning for one section of an end of the sensor having a larger value of Y coordinate at the reference position than the other end.

The boundary may also include a boundary which is generated in vertical to the Y axis in accordance with a maximum value of Y coordinate, within the scanning for one section of an end of the sensor having a smaller value of Y coordinate at the reference position than the other end.

The boundary may also include a boundary which is generated in vertical to the X axis in accordance with a lager value of X coordinate of an end of the sensor at the scan starting position within the one section than the other end.

The boundary may further include a boundary which is generated in vertical to the X axis in accordance with a smaller value of X coordinate of one end of the sensor at the scan starting position in the X negative direction within the one section than the other end.

The determination of the scanning direction of the free scanning apparatus is arranged to be performed if the scanning is over a specific moving amount or over a specific time for reading accordingly, it is possible to avoid the influence of the delicate change such as the quivering of hands.

As described above, since the image reading method and apparatus of the present invention is arranged, in order to determine whether the mapping has been performed or not, that the mapping processing is performed generating the boundary, it is not necessary to read the scanning flag or determine the specific gradation. Therefore, it is possible to obtain the effect that the mapping processing can be carried out with high quality at high speed. And since the section to generate the boundary can be changed flexibly detecting the forward direction for the scanning of the free scanning apparatus, it is possible to regenerate the image data with high quality not only in the X positive direction, but also in the scanning based on the X negative direction. Therefore, it is possible to expand the scanning method to obtain the image data with high quality. At these cases, by the scanning in the X negative direction including the movement of one end of the image reading sensor in the X positive direction and of the other end of the image reading sensor in the X negative direction, it is possible to determine the scanning direction even if the sensor performs the rotational scanning. And under the arrangement of detecting the slant of the free scanning apparatus, it is possible to correspond to the special scanning and the image data with stability can be obtained. Furthermore, since the mapping area deteriorated because of the slant scanning of the free scanning apparatus can be overwritten by the mapping of the linear scanning, it is possible to obtain the picture quality with high accuracy. At the time of detecting the slant of the free scanning apparatus, the slant information is generated in accordance with two threshold values, therefore it is possible to avoid the change of the boundary because of the delicate slant. In each method and apparatus of the present invention, since the combined boundary is generated synthesizing boundaries based on the scanning for a plural sections, the boundary can be set in detail. Therefore it is possible to to avoid to perform the unnecessary mapping and it is possible to obtain the effect that the time of the mapping can be shorten. And since the determination of the scanning direction of the free scanning apparatus is arranged to be performed if the scanning is over a specific moving amount or over a specific time for reading, it is possible to avoid the influence of the delicate change such as the quivering of hands.

BRIEF DESCRIPTION OF THE DRAWINGS

FIG. 24 is a block diagram of an image data reading apparatus in the embodiment 5 of the present invention.

FIG. 25(a) and FIG. 25(b) an explanatory diagram showing an example of a special scanning method.

FIG. 33 is an explanatory diagram showing an example of gradations of scanning information.

DESCRIPTION OF THE PREFERRED EMBODIMENTS

The explanations about the embodiment of the present invention will be described hereinafter according to the attached drawings.

Embodiment 1

Figure 1:
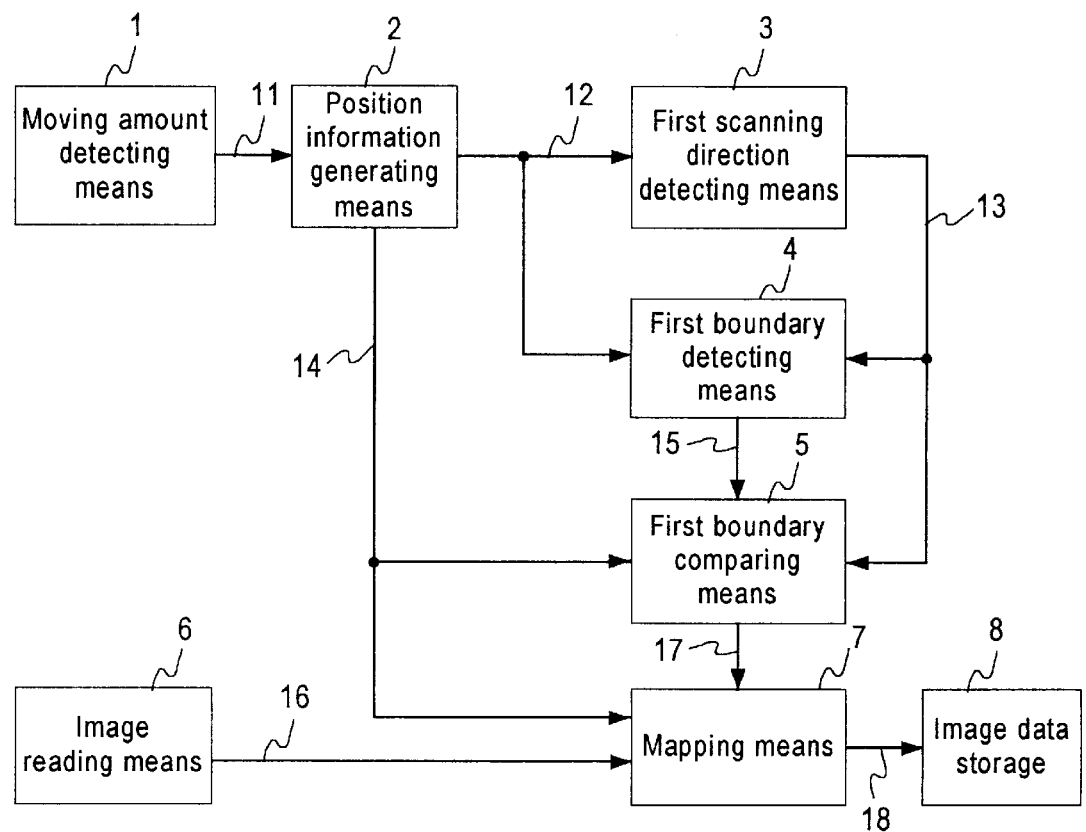
FIG. 1 is a block diagram of an image data reading apparatus in the embodiment 1 of the present invention.

FIG. 1 is a block diagram showing an image reading apparatus in the embodiment 1 of the present invention.

In FIG. 1, image reading means 6 reads out an image data by an image reading sensor of the free scanning apparatus (not shown), and moving amount detecting means 1 detects a moving amount of the free scanning apparatus.

Position information generating means 2 generates position information 12 of each element of the image reading sensor and position information 14 of each pixel that the image data 16 mapped on according to the moving amount detected by the moving amount detecting means 1. Here, both the position information 12 of each element and the position information 14 of each pixel represent the same substantially, but the position information 12 may be treated as the position information of specific elements of the image reading sensor provided to the other processings except the mapping which are illustrated below.

First scanning direction detecting means 3 detects a scanning direction of the free scanning apparatus by using the position information 12 of elements at both ends of the image reading sensor.

First boundary detecting means 4 generates a boundary for restricting the mapping according to the position information 12 of each element of the image reading sensor and scanning direction signals 13 outputted from the first scanning direction detecting means 3.

Meanwhile, first boundary comparing means 5 compares boundary signals 15 outputted from the first boundary detecting means 4 and the position information 14 of each element to be mapped, as a result if the scanning is determined to be performed in the X negative direction according to the scanning direction signals 13, the compared result is available to the restriction of the mapping.

The image data 16 is mapped (stored) by mapping means 7 in image data storage 8 using the position information 14 of each element. At this time, the mapping means 7 controls the restriction of the mapping using boundary comparing signals 17 of the first boundary comparing means 5 (including the scanning information).

From the economical point of view, DRAM or SDRAM is preferred as the image data storage 8 because it is inexpensive and having a large capacity.

Before explaining about the block diagram of the image reading means in the embodiment 1, the method of the mapping without a scanning flag will be explained according to the explanatory diagram of the boundary detecting method in FIG. 2.

When an image reading sensor 51 of the free scanning apparatus (not shown) moves in the X positive direction shown as the scanning 21, the KLMN area for one section can be readout.

After reading up to the position of a straight line LM the scanning is performed in the X negative direction. The position information generating means 2 calculates coordinates of each element per reading line on the curved line NM (shown as a straight line in order to explain easily), detects the minimum Y coordinate (the Y coordinate of the point N in this case), and then generates a boundary 22 vertical to the Y axis.

Under those conditions, if the scanning (for example, the scanning 342 in FIG. 28) is performed in the X negative direction, the mapping is arranged to be performed only for the image data from the sensor elements having the Y coordinate larger than the boundary 22. According to the constitution, it is possible to perform without using the scanning flag the mapping with remaining most of the overlapped area in stead of rewriting.

And the scanning in the X negative direction does not always be performed along with the scanning in the Y positive direction (shown as downward in the drawing), therefore using the maximum Y coordinate (the Y coordinate of the point L in this case) among the coordinates of each element every reading line on the curved line KL, a boundary 23 vertical to the Y axis may be generated. At that time, the mapping is to be performed only for the image data obtained from the element having a smaller Y coordinate than the boundary 23.

A boundary 24 vertical to the X axis is arranged to be generated using the larger X coordinate of a point K and L (the X coordinate of a point K) which the element of each end of the image reading sensor 51 is situated at the starting point within an area of a section, and when the scanning is performed in the X negative direction over the line KN, it is possible to avoided the trouble that the mapping is not performed for the image data of the element having smaller X coordinate than the boundary 24.

Next, it will be explained about the first scanning direction determined method. There are some method for determining the scanning direction of the free scanning apparatus. One is that the scanning direction is defined as the moving direction of the center position of the image reading sensor 51.

It is all right to determine the scanning direction according to that method. But there is a possibility that the free scanning apparatus is determined to move in the X positive direction even if the X coordinates of one end of the image reading sensor 51 moves in the positive direction and the other in the negative direction.

Figure 3:
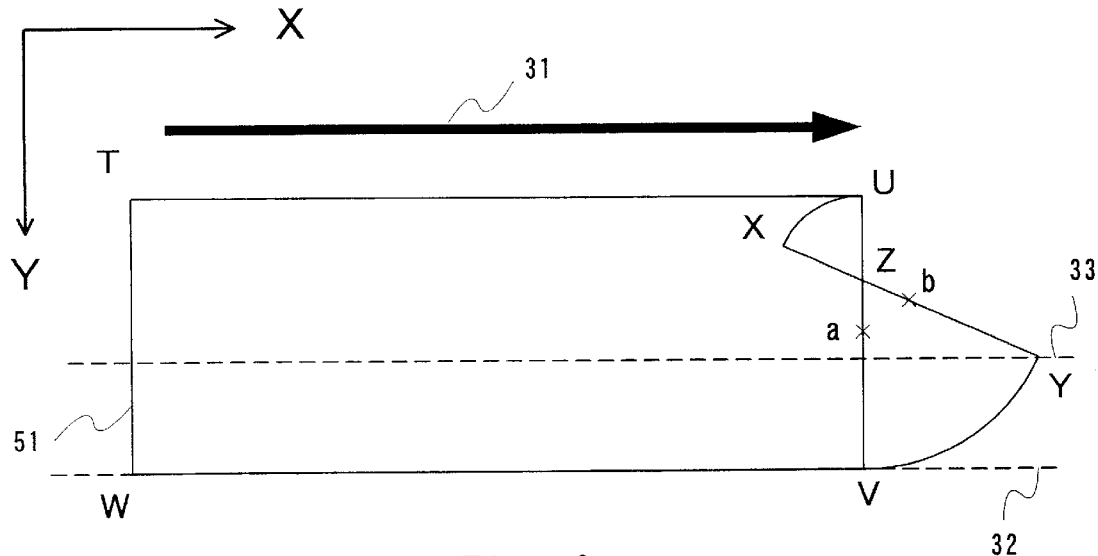
FIG. 3 is an explanatory diagram for a rotational scanning.

Those are explained referring to the explanatory diagram of the rotational scanning in FIG. 3. When the scanning 31 is executed in the X positive direction, the TUVW area can be obtained first. Here, the image reading sensor is situated at the straight line UV, if in order to perform the scanning in the X negative direction from that point, for example, the image reading sensor 51 rotates at the position Z near to the end portion from the center of the image reading sensor 51, the image reading sensor 51 moves on the straight line XY.

At this time, the center position a of the image reading sensor 51 which is situated on the straight line UV moves to the position b on the straight line XY, but the the moving direction is the X positive direction. Therefore the boundary 32 generated by the moving up to the straight line UV should change to the boundary 33 generated by the moving up to the straight line XY. Since it occurs that the most of the area mapped by the scanning 31 is rewritten by the slant scanning after the return-back when the boundary raises upward, the picture quality is deteriorated.

To avoid that trouble, the scanning in the X negative direction is arranged to include that one end of the image reading sensor 51 moves in the X positive direction and the other end moves in the X negative direction In other words, it may be arranged that the case that both ends of the image reading sensor 51 moves in the X positive direction is defined as the scanning in the X positive direction, and the other case is defined as the scanning in the X negative direction.

Even though the scanning is performed in the X positive direction, since the operation is made by hand (not shown), there is a possibility that the quivering of a hand causes to perform the scanning in the X negative direction for an extremely short time. At this time, it happens that the area for one section is too small to execute smoothly the mapping with a boundary. To avoid those trouble, it may be arranged that the determination of the scanning direction is performed when the scanning time is over the specific reading time or the moving amount is over the specific value.

Figure 4:
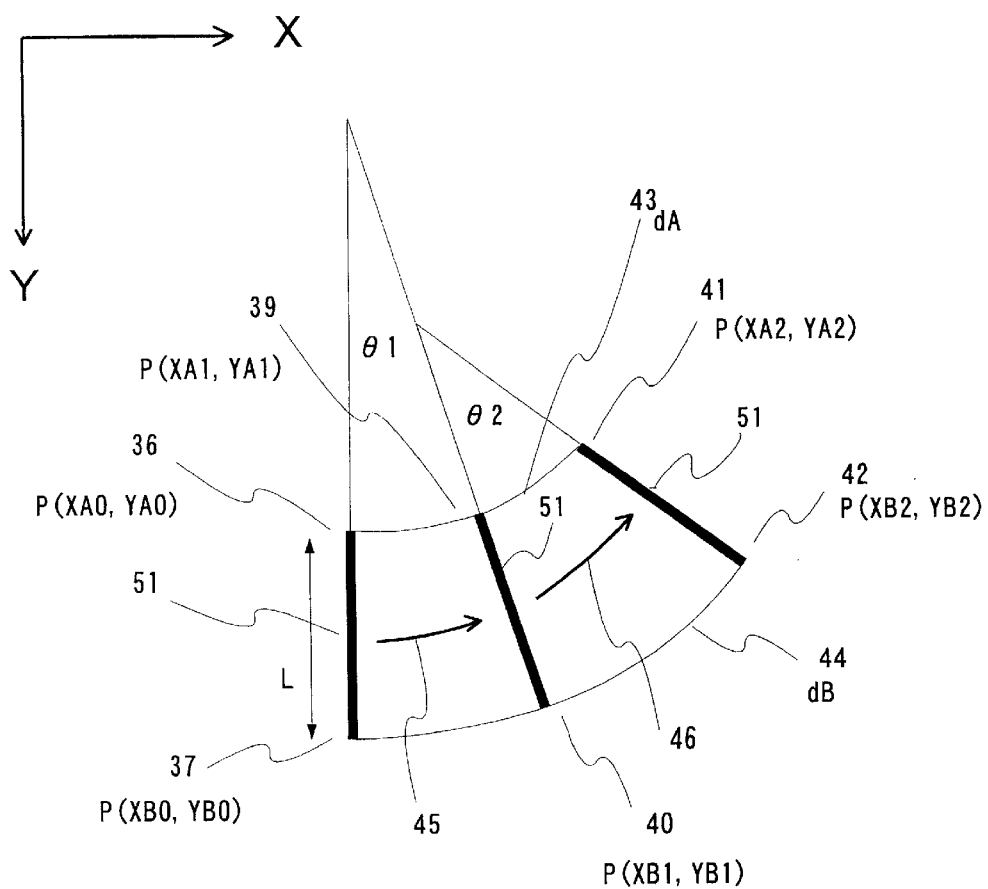
FIG. 4 is an explanatory diagram for a position information generating method.

Meanwhile, FIG. 4 is an explanatory diagram of a position information generating method, which is described briefly because of a well-known method.

In FIG. 4, the free scanning apparatus is provided nearby both ends of the image reading sensor 51 with a wheel respectively. The reference coordinate 36, which is the reference position of one wheel (called a wheel A hereinafter), is represented by P (X, Y)=(XA0, YA0), and the reference coordinate 37, which is the reference position of the other wheel (called a wheel B hereinafter), is represented by P (X, Y)=(XB0, YB0).

Assuming that the wheel A moves to the coordinate 39 while the wheel B to the coordinate 40 by the scanning of the free scanning apparatus, the coordinates of each wheel at each position are represented by P (XA1, YA1) and P (XB1, YB1) respectively. In addition, the moving angle from the reference position is represented by θ1 (unit: radian) as shown in FIG. 4.

Next, assuming that the wheel A moves to the coordinates 41 and the wheel B to the coordinate 42 after an extremely short time, the coordinates at each position are represented by P (XA2, YA2) and P (XB2, YB2) respectively as shown in FIG. 4. And the moving angle is represented by θ2. The θ2 is a very small angle, however, which is illustrated as a large angle for the explanation in FIG. 4.

Though the wheel A moves on an arc 43, the moving length for the extremely short time approximates to the bowstring length dA connecting the coordinates 39 and 41. Likewise, the arc 44 approximates to the bowstring length dB connecting the coordinates 40 and 42. Therefore, the moving angle θ2 shown in FIG. 4 approximates to the following equation (1)

$$\theta 2 = (dB - dA)/L \tag{1}$$

Furthermore, each coordinates value (XA2, YA2) and (XB2, YB2) for the coordinates 41 and 42 approximates to the following equations (2) using each coordinates value (XA1, YA1) and (XB1, YB1) for the coordinates 39 and 40 in one prior step.

$$XA2=XA1+dA\cdot\cos(\theta1+\theta2/2)$$

$$YA2=YA1-dA\cdot\sin(\theta1+\theta2/2)$$

$$XB2=XB1+dB\cdot\cos(\theta1+\theta2/2)$$

$$XB2=YB1-dB\cdot\sin(\theta1+\theta2/2) \quad (2)$$

And according to the coordinates 41 and 42, the increase θX of the X coordinate and ΔY of the Y coordinate per unit length between the wheel A and B is defined as the following equations (3).

$$\theta X=(XB2-XA2)/L$$

$$\theta Y=(YB2-YA2)/L \quad (3)$$

If the unit length of the memory coordinates is equal to the length of the pixel pitch of the image reading sensor 51, the processing circuit becomes simple. Accordingly it is arranged in the embodiment 1 that the unit length is equal to the length of the pixel pitch and the increase ΔX of the X coordinate and ΔY of the Y coordinate are generated per pixel pitch respectively.

The coordinates that are given by the above equation (2) represent the coordinates of each wheel, and the length from the wheel to the end of the image reading sensor 51 has been already known, accordingly the coordinates of each end of the sensor can be given by the increase ΔX and ΔY of the equation (3).

Figure 5:
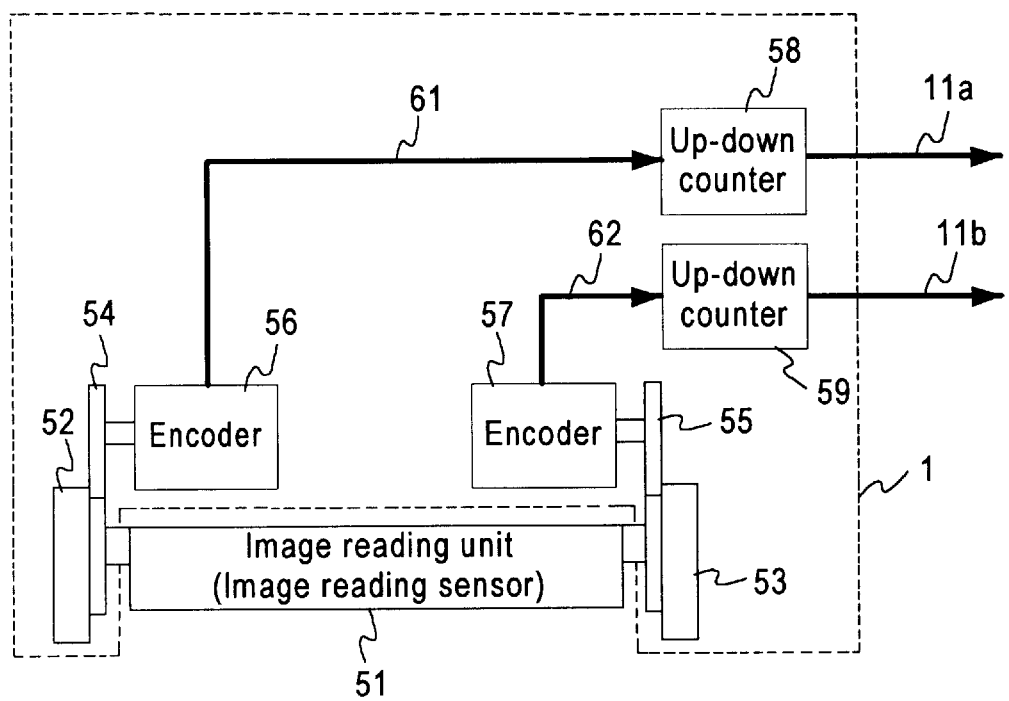
FIG. 5 is an explanatory diagram showing an example of a moving amount detecting unit of moving amount detecting means.

FIG. 5 is an explanatory diagram showing an example of a moving amount detecting unit of a moving amount detecting means 1 in FIG. 1.

As shown in FIG. 5, the moving amount detecting unit is provided with a wheel 52 and 53, an encoder 56 and 57, a gear 54 and 55 for transmitting the rotation amount of the wheel to an encoder, and an up-and-down counter 58 and 59.

An image reading unit 51 which is a part of the image reading means 6 is composed of the image reading sensor 51 arranged between the wheel 52 and 53. According to the movement of the image reading unit 51, the wheel 52 and 53 rotate. The amount of the rotation of the wheels is converted to pulse signals 61 and 62 by the encoder 56 and 57. The up-and-down counter 58 and 59 count up the number of the pulse of the pulse signals 61 and 62, therefore the moving amount of the free scanning apparatus can be detected.

The encoder 56 and 57 are for outputting the pulse signals with two phases modulated by the rotational direction, and can detect the rotational direction of the wheels in the positive and negative directions (the moving direction).

Figure 6:
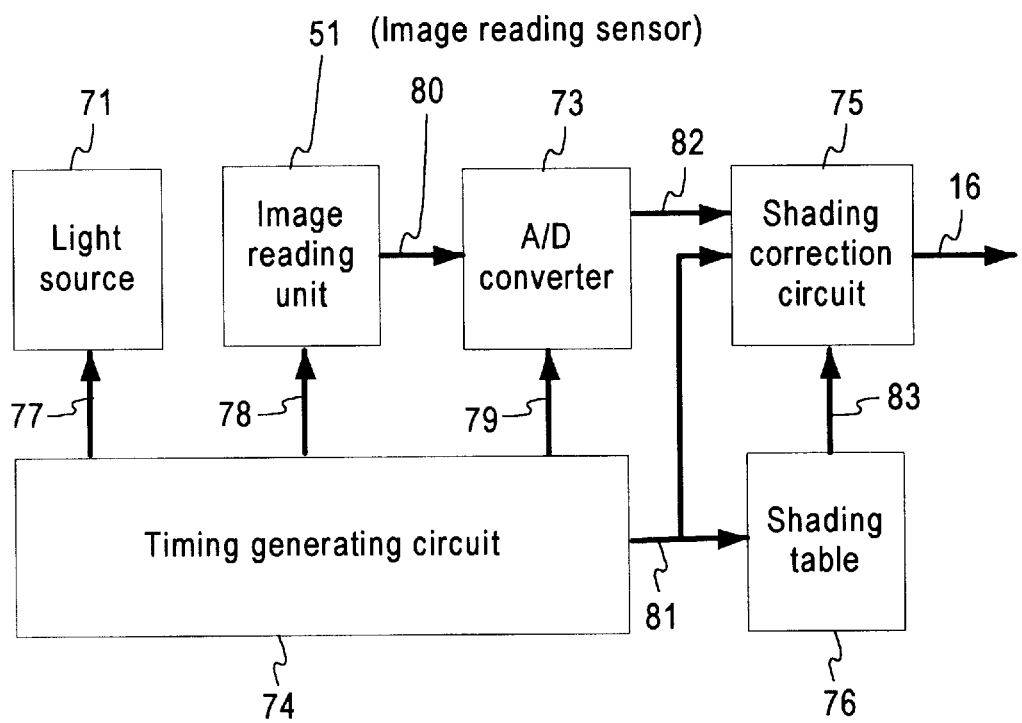
FIG. 6 is a block diagram showing an example of an image data reading circuit of image data reading means.

FIG. 6 is a block diagram showing an example of an image reading circuit of the image reading means 6 in FIG. 1. The following description is made in brief because of a well-known prior art.

The image reading circuit is provided with a light source 71 of LED, an image reading unit 51 comprising the image reading sensor 51 and an amplifier, an A/D converter 73 converting analog sensor signals 80 to digital signals, a shading correction circuit 75 correcting an unevenness of the light source and an irregularity of the sensor sensitivity, a shading table 76 storing a value of a white reference level (or the inverse value of it) which is used for the normalization of each pixel at the shading correction, and a timing generating circuit 74 controlling those timing Since the image reading circuit shown in FIG. 6 is a general basic type provided with a scanner and etc., the explanation will not be described here. But the shading correction may be arranged to be processed by programs of software instead of the electric circuit (hardware).

Figure 7:
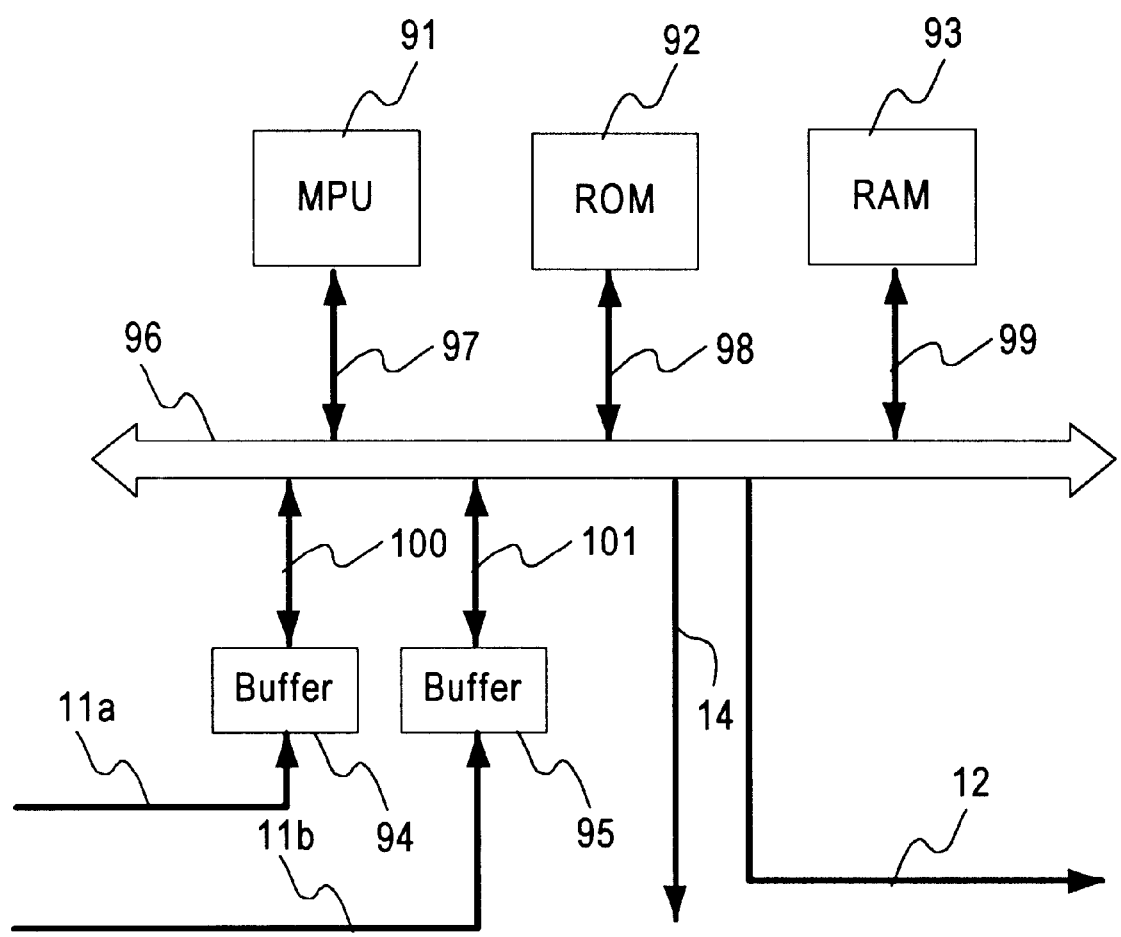
FIG. 7 is a block diagram showing an example of a position information generating circuit of position information generating means.

FIG. 7 is a block diagram showing an example of a position information generation circuit of the position information generating means 2 in FIG. 1.

The position information generating circuit is provided with MPU microprocessor) 91 containing the position information generating means 2 for calculating the coordinates of both ends of the image reading sensor 51 according to the moving amount 11a and 11b outputted from the moving amount detecting means 1, ROM (Read Only Memory) 92 storing the controlling program of MPU 91, RAM (Random Access Memory) 93 as a working area when the MPU 91 makes the calculation, and a buffer 94 and 95 storing the moving amount temporarily.

The moving amount 11 (11a, 11b) outputted from the moving amount detecting means 1 is stored in the buffer 94 and 95 respectively.

Using the moving amount 11a and 11b of information of the length of the arc and the fixed constant (the length L between the wheels) of the free scanning apparatus, in accordance with the equations (1), (2) and (3), MPU 91 finds the coordinates of the wheels and the both ends of the image reading sensor 51 and the increase ΔX and ΔY, and calculates the coordinates of each element of the image reading sensor 51. And then MPU 91 outputs the result thus given as an information 97.

Figure 8:
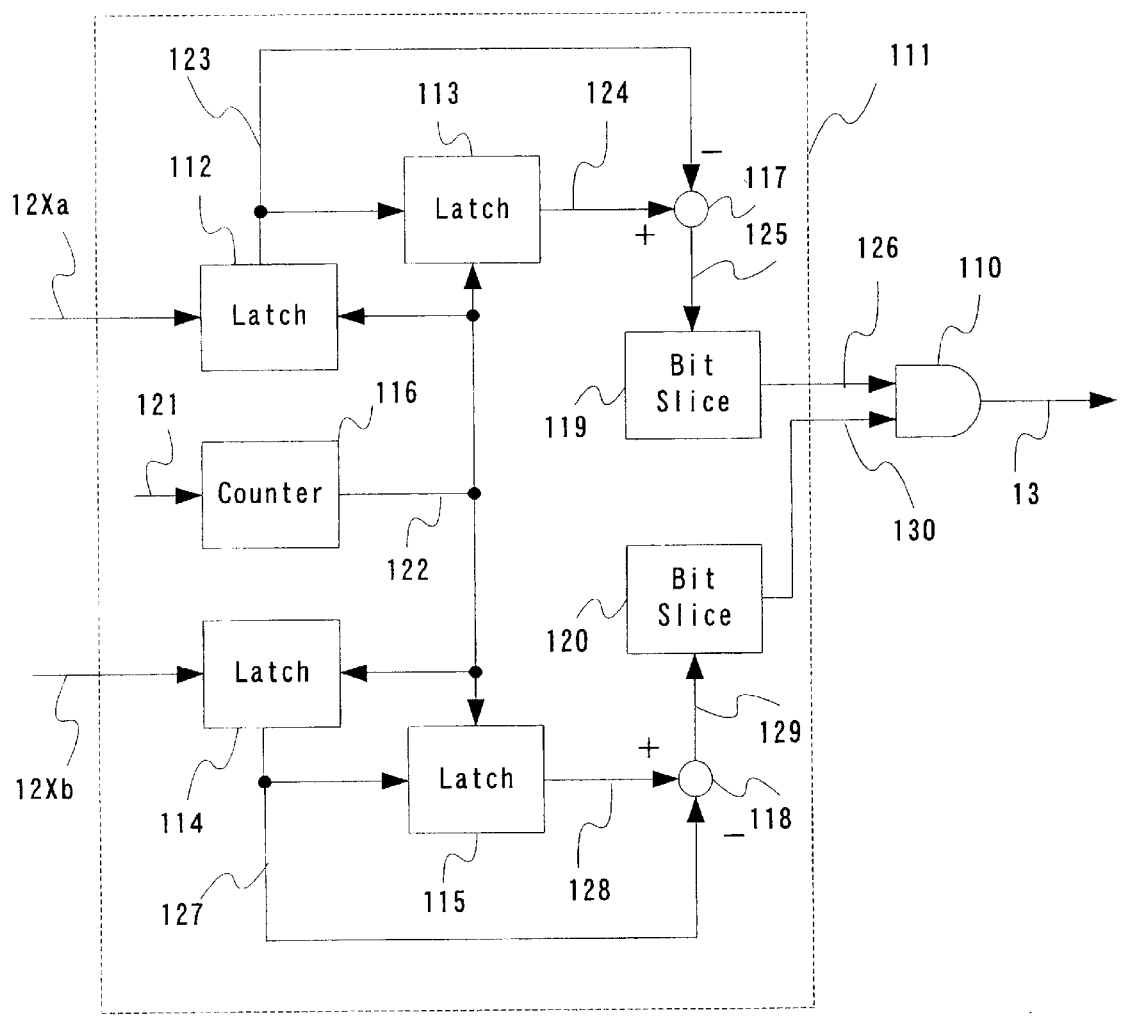
FIG. 8 is a block diagram showing an example of a scanning direction detecting circuit of first scanning direction detecting means.

FIG. 8 is a block diagram showing an example of a first scanning direction detecting circuit of the first scanning direction detecting means 3 in FIG. 1.

The first scanning direction detecting circuit is provided with a latch 112 to 115, a counter 116, a subtracter 117 and 118, a bit slice 119 and 120, an AND element 110. The first scanning direction detecting circuit is, in case of both ends of the image reading sensor 51 having a specific space between them and moving in the positive direction, for changing the scanning direction signals 13 to high level signals.

In the first scanning direction circuit, the position information 12 (the X coordinate 12Xa, 12Xb of the element of each end of image reading sensor) outputted from the position information generating means 2 are inputted to the latch 112 and 114 respectively. And line synchronous signals 121 of the sensor line are inputted to the counter 116.

The counter 116 counts up the line synchronous signals 121, and outputs latch enable signals 122 at an interval of specified lines. Thereby, in accordance with a first latch enable signal 122 the latch 112(114) holds the position information 12Xa(12Xb) corresponding to the latch enable signals 122, and then in accordance with the next latch enable signal 122 the latch 112(114) holds the position information 12Xa(12Xb) corresponding to the next latch enable signal 122. The position information 12Xa(12Xb) corresponding to the former latch enable signal 122 is held by a latch 113 (a latch 115). At this time, the position information held by the latch 113(115) is constrained to have a value later by the specified lines than the position information held by the latch 112(114). The output signals 123(127) of the latch 112(114) are inputted to the subtracter 117(118) and the output signals 124(128) of the latch 113(115) are also inputted to the subtracter 117(118). In the subtracter 117(118) the output signals 124—the output signals 123 (the output signals 128—the output signals 127) is calculated.

When the X coordinate of the end of the image reading sensor 51 changes to the positive direction according to the above result, the output 125 of the subtracter 117 is a negative value. Accordingly, signals 126 of the most significant bit obtained from the bit slice 119 become high levels. Likewise, when the X coordinate of the other end of the image reading sensor 51 changes to the positive direction, the output 130 of the bit slice 120 becomes a high level.

Conversely, when the end and/or both ends of the image reading sensor 51 move in the X negative direction (including the stop of the image reading sensor), the scanning direction signals 13 which are the output of the AND element 110 become low levels. Thereby it it possible to detect the scanning direction.

Figure 9:
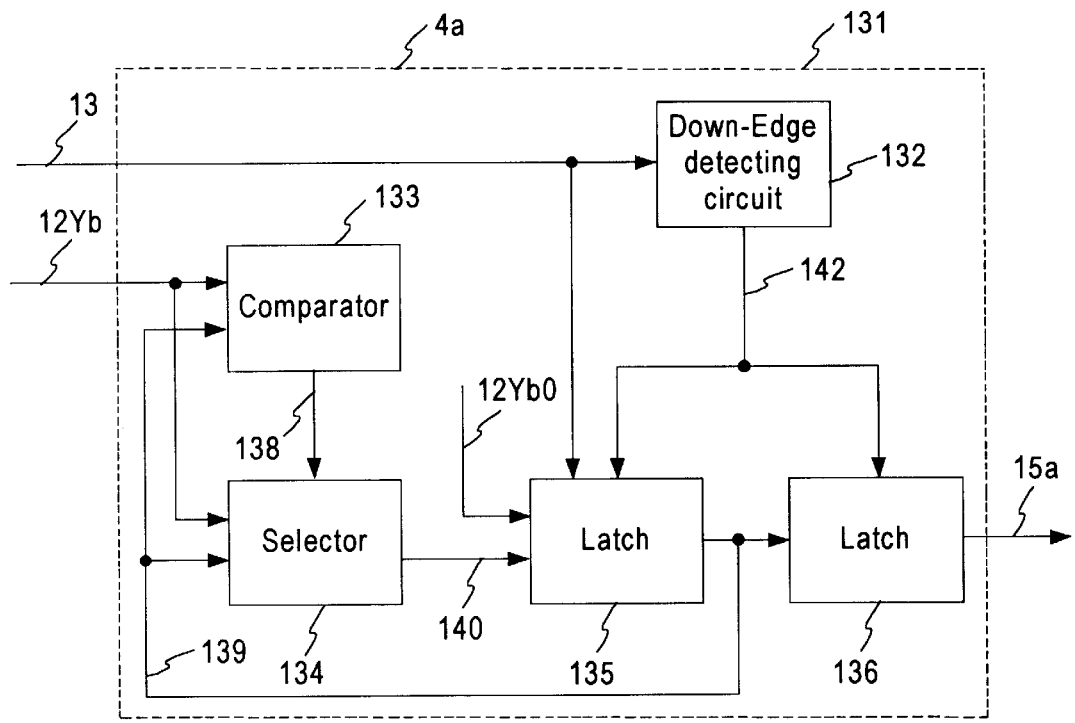
FIG. 9 is a block diagram showing an example of a boundary detecting circuit 4a of first boundary detecting means.

FIG. 9 is a block diagram showing an example of a boundary detecting circuit 4*a* of the first boundary detecting means 4 in FIG. 1.

Figure 2:
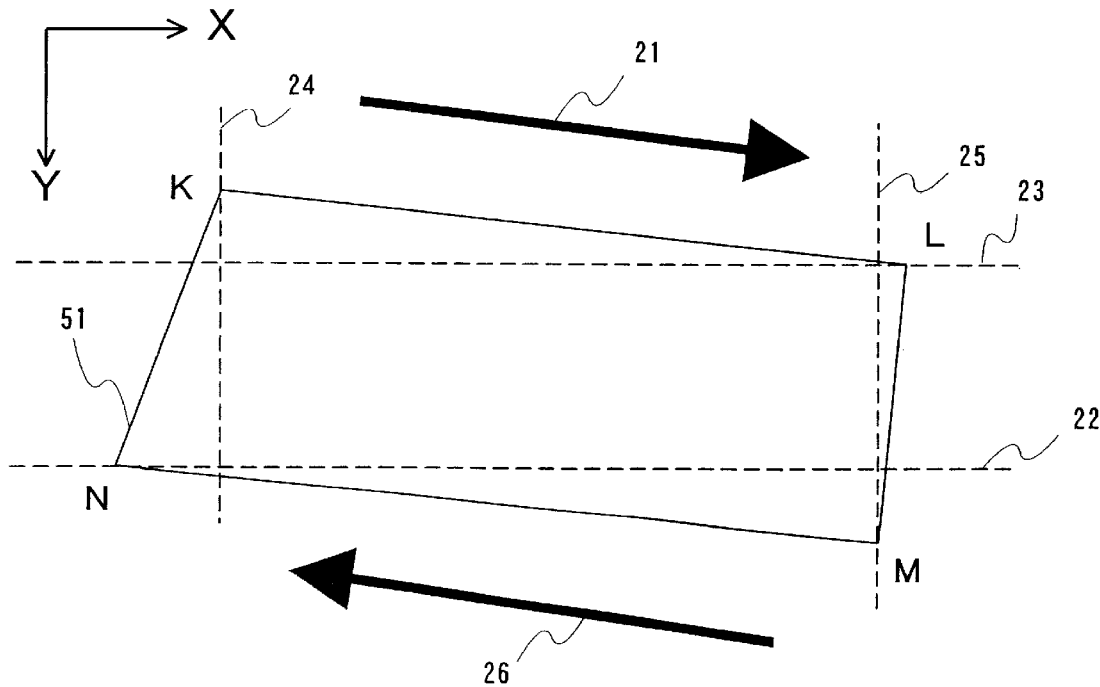
FIG. 2 is an explanatory diagram for a boundary detecting method.

The boundary detecting circuit 4*a* is provided with a comparator 133, a selector 134, a latch 135 and 136, and a down-edge detecting circuit 132, and said circuit 4*a* detects the boundary 22 in FIG. 2.

The Y coordinate 12Y*b* of the element of the end of the image reading sensor 51 (of an end of the image reading sensor 51 having the value of the Y coordinate larger than the other) outputted from the position information generating means 2 in FIG. 1 is inputted to the comparator 133, and is compared with the position information 139 outputted from the latch 135. As described after, the latch 135 stores an initial value to detect the boundary of one section area, that is, the Y coordinate 12Y*b*0 of the element of the end of the image reading sensor 51 at the first position within the section (of an end of the image reading sensor 51 having the initial value of the Y coordinate larger than the other) or the output 140 of the selector 134. The comparator 133 output the compared result 138 to the selector 134. When the compared result 138 indicates the position information 139>the position information 12Y*b*, the position information 12Y*b* is outputted. Otherwise, when the compared result indicates the position information 139<the position information 12Y*b*, the position information 139 is outputted. Namely, the selector 134 outputs whichever the position information, the position information 12Y*b* or 139, has the smaller value of the Y coordinate than the other, that is, outputs the position information 140.

The scanning direction signals 13 outputted from the first scanning direction detecting means 3 are inputted as the control signals to the latch 135. But when the scanning signals 13 are high levels, the latch 135 holds the output signals of the selector 134.

Meanwhile, the scanning signals 13 are also inputted to the down-edge detecting circuit 132, where the time of the down of the edge of the scanning signals, that is, the time that the free scanning apparatus does not move in the X positive direction and the scanning for one section is completed, is detected. The down-edge signals 142 outputted from the down-edge detecting circuit 132 change to latch enable signals of the latch 136, and the latch 136 holds the minimum value of the Y coordinate of the one section outputted from the latch 135, and then those are outputted as boundary signals 15*a* corresponding to the boundary 23. The down-edge signals 142 change to load signals of the latch 135, and the latch 135 holds the initial value 12Y*b*0 which will change the initial value for detecting the boundary within next section.

Therefore, only when the free scanning apparatus is scanning in the X positive direction, the minimum Y value of tracks within one section of the end of the image reading sensor 51 gets to be outputted from the latch 136, and in accordance with the Y value the boundary is generated.

Figure 10:
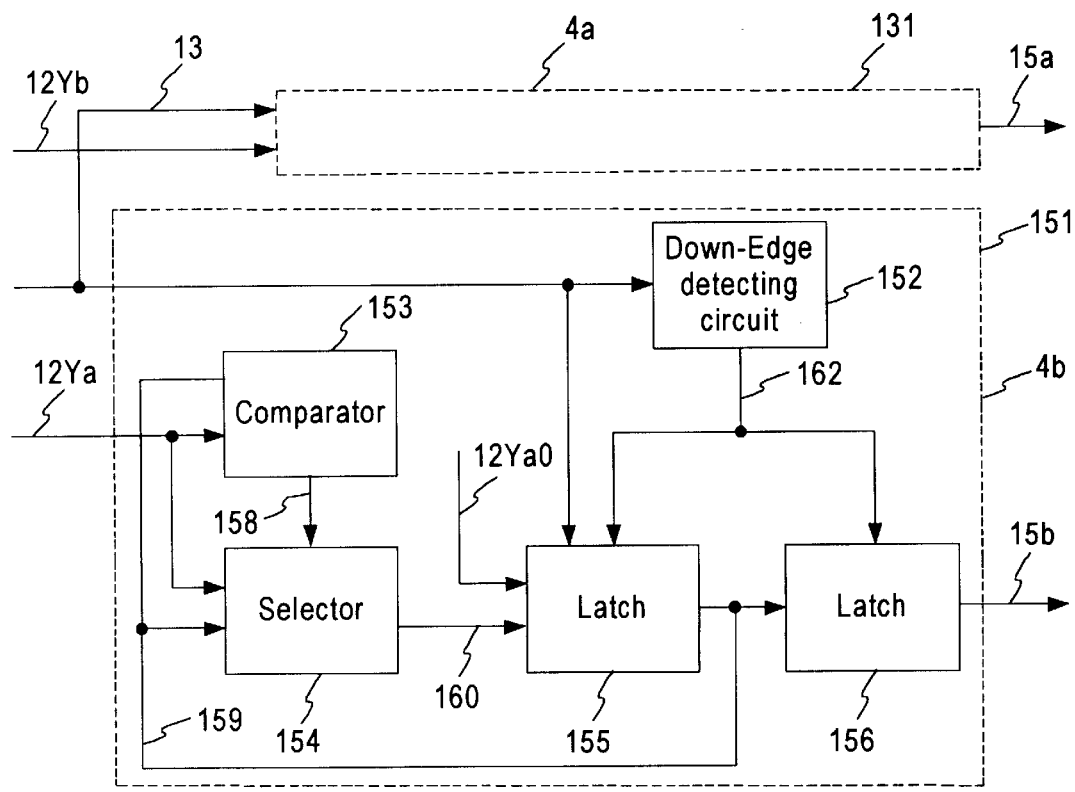
FIG. 10 is a block diagram showing an example of a boundary detecting circuit 4b of first boundary detecting means.

FIG. 10 is a block diagram showing a boundary detecting circuit 4*b* described as the other example of the first boundary detecting means 4 in FIG. 1.

The boundary detecting circuit 4*b* is for detecting the boundary 23 in FIG. 2, which is arranged that the function for detecting a boundary at the upper end of the image reading sensor 51 is added to the boundary detecting circuit 4*a*. The additional parts are illustrated to be surrounded by a dot line 151, and comprises a comparator 153, a selector 154, a latch 155 and 156, and a down-edge detecting circuit 152. And the parts which is the same as the detecting circuit 4*a* is illustrated to be surrounded by a dot line 131. The operation of the boundary detecting circuit 4*b* is almost the same as of the boundary detecting circuit 4*a*, and the explanation will be described in brief as follows.

The comparator 153 compares the position information 12Y*a* of the Y coordinate of the element of one end (having a smaller Y value) of the image reading sensor 51 and the position information 159 obtained from the latch 155, of which result signals 158 are inputted to the selector 154. The latch 155 has held the value 12Y*a*0 of one end at the initial position of the image reading sensor 51 as an initial value or the output signals 160 of the selector 154. Here, where the resulting signals 158 indicate the position information 159>the position information 12Y*a*, the selector 154 alternatively inputs the position information 159, otherwise the position information 12Y*a* if it is the opposite case, as signals 160 to the latch 155 respectively. The signals held in the latch 155 are held by the latch 156 when the down-edge detecting circuit 152 detects the finish of the scanning in the X positive direction. And then, the latch 156 outputs the boundary signals 15*b* corresponding to the boundary 22. Namely, the boundary detecting circuit 4*b* can detect the maximum Y value of one end of the image reading sensor 51.

And the value 161 of one end at the initial position of the image reading sensor 51 is inputted to the latch 155 by the down-edge signals 162. However, it is needless to say that the common unit such as the down-edge detecting circuit 152 and etc. may be arranged to be shared with the construction in FIG. 9.

Figure 11:
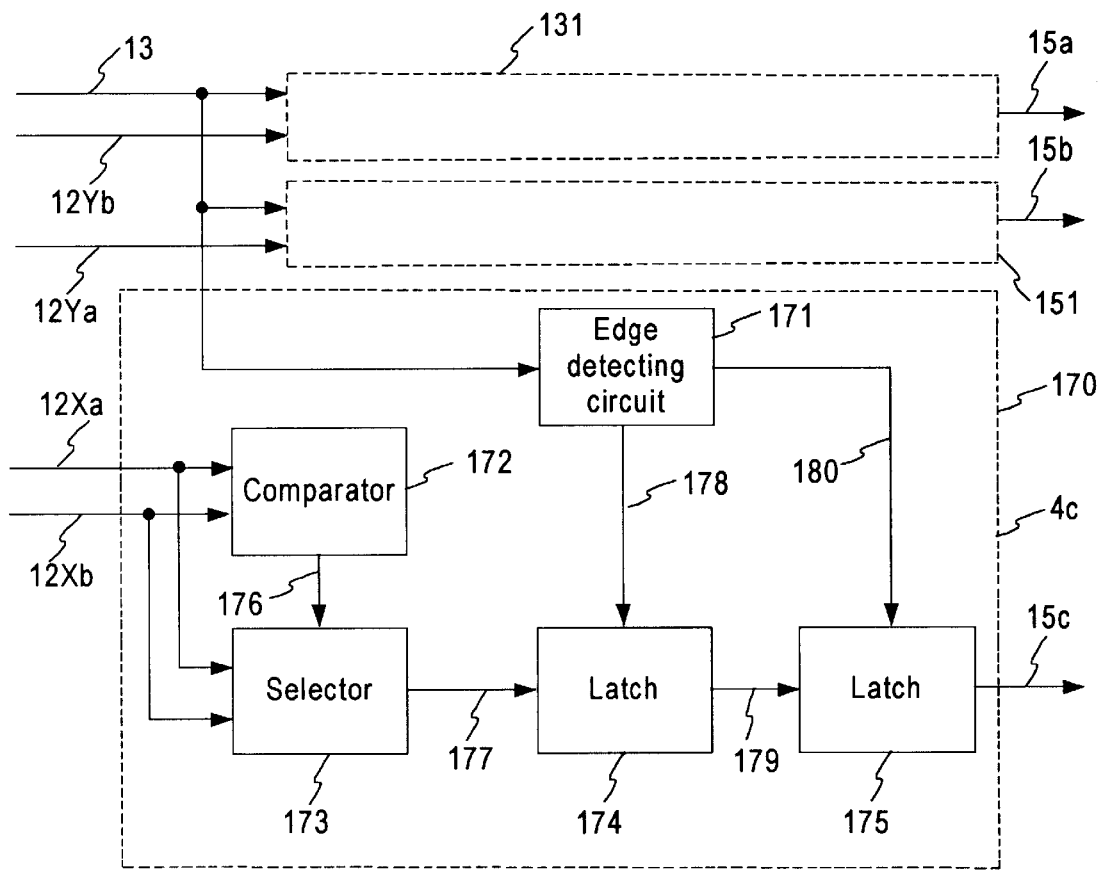
FIG. 11 is a block diagram showing an example of a boundary detecting circuit 4c of first boundary detecting means.

FIG. 11 is a block diagram showing the other example of the boundary detecting circuit 4*c* of the first boundary detecting means 4 in FIG. 1.

The boundary detecting circuit 4*c*, which is an arrangement that a portion surrounded by a dot line 170 is added to the boundary detecting circuit 4*b*, detects the boundary 24 in FIG. 2. The additional parts to the boundary detecting circuit 4*c* comprise a comparator 172, a selector 173, a latch 174 and 175, and an edge detecting circuit 171. The same parts as the boundary detecting circuit 4*a* and 4*b* will not explained here.

Regarding the position information 12 outputted from the position information generating means 2 in FIG. 1, the position information 12X*a* and 12X*b* corresponding to the X coordinate of element at both ends of the image reading sensor 51 are inputted to the comparator 172, and the compared result 176 is outputted to the selector 173. Besides, since the position information 12X*a* and 12X*b* has been also inputted to the selector 173, the selector 173 selects the larger value of the X coordinate in accordance with the compared result 176 and outputs it to the latch 174.

Meanwhile, the scanning direction signals 13 outputted from the first scanning direction detecting means 3 in FIG. 1 is inputted to the edge detecting circuit 171. Besides the edge detecting circuit 171 outputs up-edge detecting signals 178 when the scanning direction signals 13 change from low levels to high levels, that is, at the position of starting the scanning, the down-edge detecting signals 180 are outputted when those change from the high level to the low level, that is, at the position of finishing the scanning Accordingly, the latch 174 holds the position information of the maximum X coordinate in accordance with the up-edge detecting signals 178 at the time of starting the scanning and the latch 175 holds the content of the latch 174 at the time of finishing the scanning, that is, the maximum X coordinate at the starting position for the scanning, in accordance with the down-edge detecting signals 180, thereby outputs the boundary signals 15c corresponding to the boundary 24.

In this embodiment the portion surrounded by a dot line 170 is added to the boundary detecting circuit 4b shown in FIG. 10, but it may be arranged that the portion surrounded by a dot line 170 is added to the boundary detecting circuit 4a shown in FIG. 9.

Figure 12:
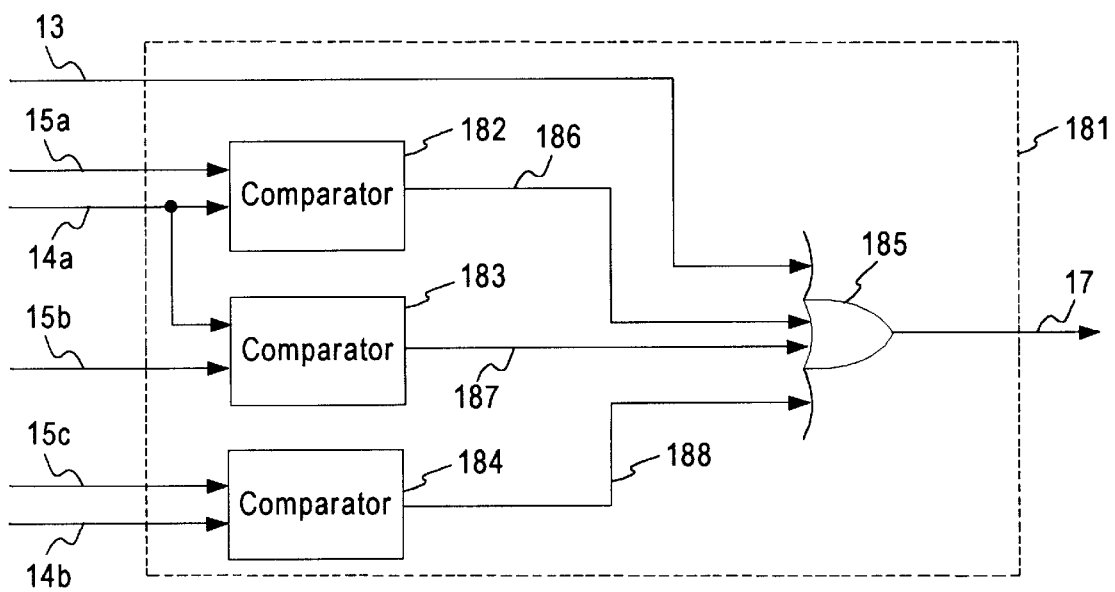
FIG. 12 is a block diagram showing an example of a boundary comparing circuit of first boundary comparing means.

FIG. 12 is a block diagram showing an example of a boundary comparing circuit of the first boundary comparing means 5 in FIG. 1.

The boundary comparing circuit is provided with a comparator 182 to 184, and an OR element 185. Boundary signals 15a, 15b and 15c outputted from the boundary detecting circuit 4c in FIG. 11 are inputted to the comparator 182, 183, and 184 respectively. Meanwhile, the position information 14a (a Y coordinate signal) of each element of the image reading sensor 51 outputted from the position information generating means 2 in FIG. 1 are inputted to the comparator 182 and 183, and the position information 14b (a X coordinate signal) are inputted to the comparator 184, and those are compared with each boundary signal 15a, 15b and 15c.

For example, referring to the example in FIG. 2, in case of a pixel obtained from the element having the Y coordinate larger than of the boundary 22, the output signals 186 of the comparator 182 become high levels, and in case of a pixel obtained from the element having the Y coordinate smaller than of the boundary 23, the output signals 187 of the comparator 183 become high levels, moreover in case of a pixel obtained from the element having the X coordinate smaller than of the boundary 24, the output signals 188 of the comparator 184 become high levels, and those are inputted to the OR element 185 respectively.

The OR element 185, when at least either one of the output signals from the comparator 182, 183 or 184 or the scanning direction signal 13 outputted from the the first scanning direction detecting means 3 become high levels, the boundary comparing signals 17 of the compared result are changed to high levels. Namely, in case of the scanning in the X positive direction all pixel signals obtained from the image reading sensor 51 are to be mapped, and in case of the scanning in the X negative direction the pixel signals obtained from elements outside the boundary 22, 23 and 24 are to be mapped.

Figure 13:
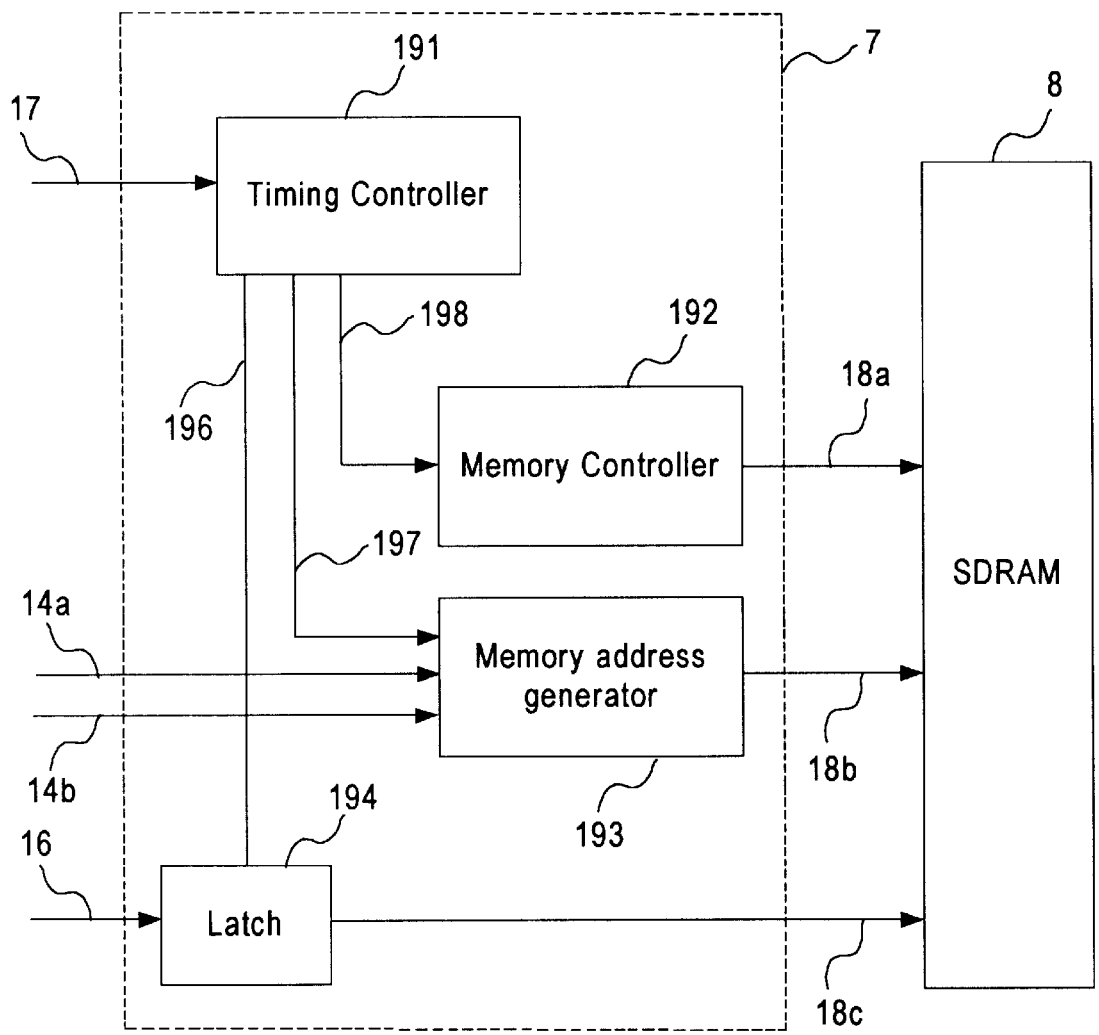
FIG. 13 is a block diagram showing an example of a mapping processing circuit of mapping processing means and an image data memory of image data storage means.

FIG. 13 is a block diagram showing an example of both a mapping processing circuit of the mapping means 7 and an image data memory of the image data storage 8 shown in FIG. 1.

The mapping processing circuit as shown in FIG. 13 is provided with a timing controller 191, a memory controller 192, a memory address generator 193, and a latch 194. Since this type of mapping circuit is well-known, the explanation will be described in brief. And SDRAM (a synchronous DRAM) is used as an image data storage 8.

The position information 14a and 14b of each element outputted from the position information generating means 2 in FIG. 1 are inputted to the memory address generator 193, the memory address generator 193 generates an address of SDRAM 8 in accordance with the position information 14a and 14b of each element, and the memory controller 192 generates control signals to access to SDRAM 8 (for instance, a writing command). Since the method for accessing to SDRAM 8 is well-known, the explanation will not be given here.

The timing controller 191 synchronizes the timing of generating signals 18a from the memory controller 192 and signals 18b from the memory address generator 193, and of the timing of outputting signals 18c of the image data to be mapped from the latch 193. At this time, if the boundary comparing signals 17 are high levels, the mapping is to be performed into SDRAM 8, while in case of low levels, the mapping into SDRAM 8 are not to be performed.

But it may be arranged that, when the boundary comparing signals 17 are low levels, the mapping for the object pixel is skipped and then it is performed to proceed the next processing for the next image data obtained from the image reading sensor 51, therefore it is possible to make the mapping process more speedy.

In accordance with the Embodiment 1 as described above, instead of using a scanning flag for confirming whether the image data has been already mapped or not, the mapping processing is performed by making a boundary. Therefore, it is possible to perform the mapping in high speed and with high quality.

Embodiment 2

Figure 14:
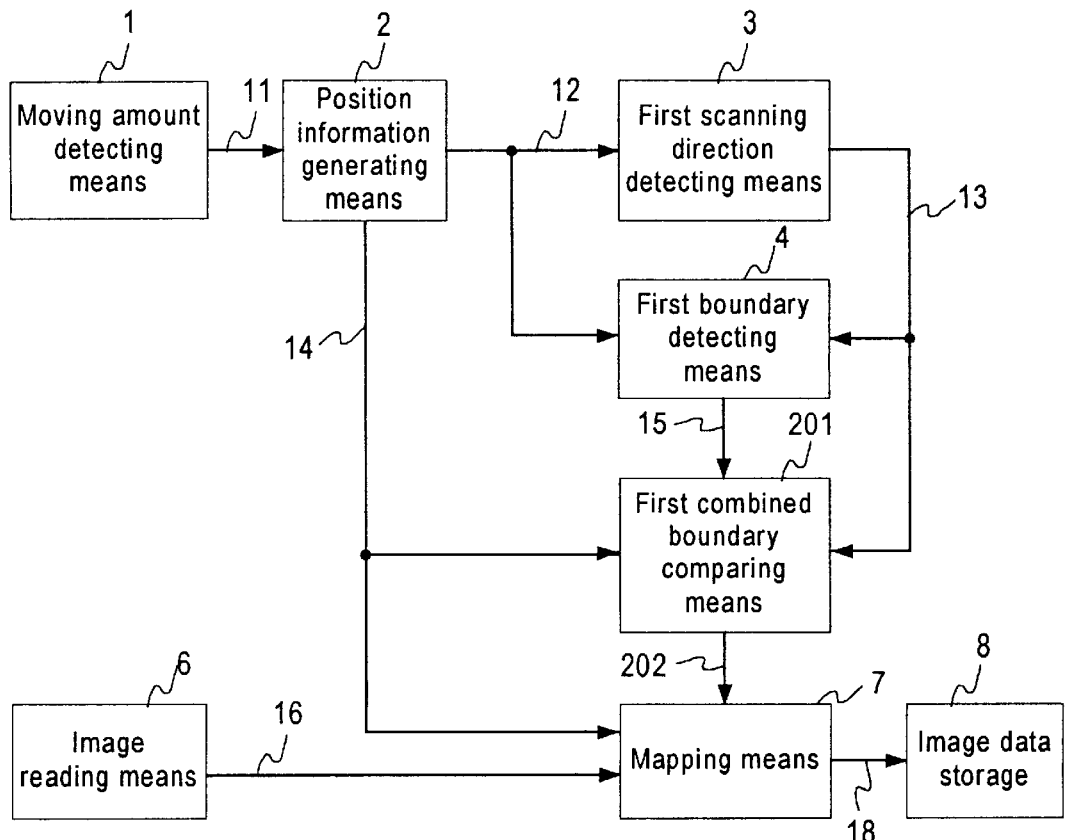
FIG. 14 is a block diagram of an image data reading apparatus in the embodiment 2 of the present invention.

FIG. 14 is a block diagram showing an image data reading apparatus in the embodiment 2 of the present invention.

Though the image data reading processing in the embodiment shown in FIG. 1 corresponds to one section of the scanning shown in FIG. 2, the process regarding the scanning for combined sections is described hereinafter referring to FIG. 15.

Figure 15:
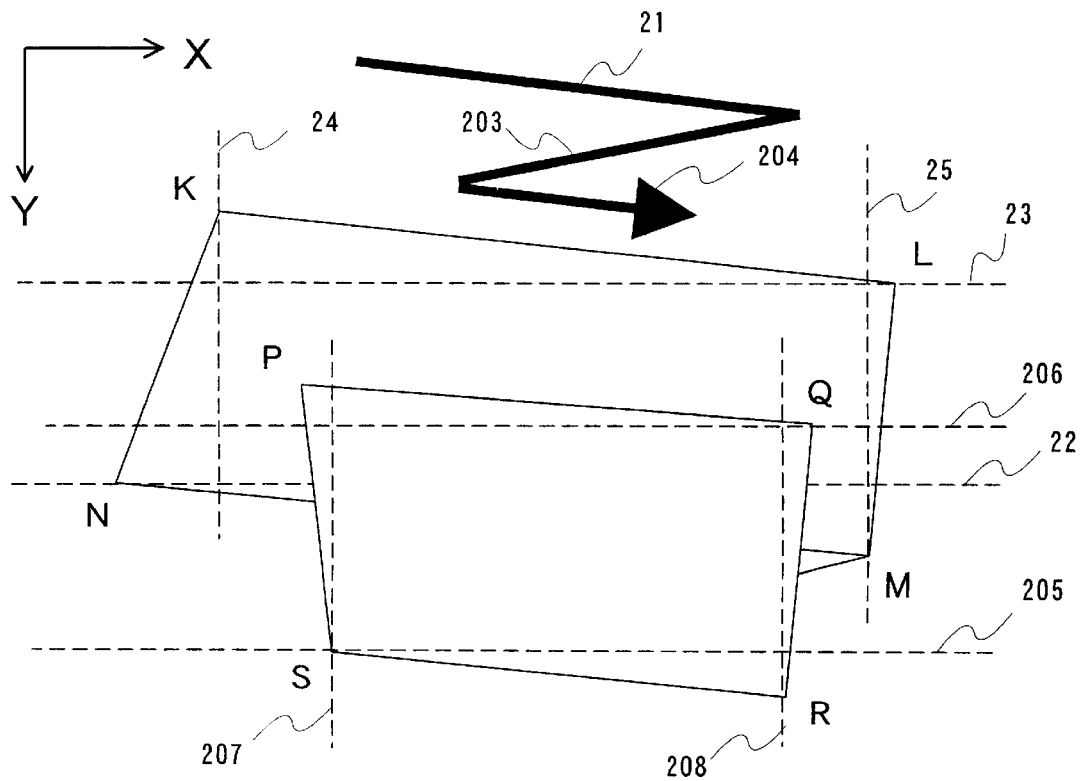
FIG. 15 is an explanatory diagram for a combined boundary detecting method.

In FIG. 15, which is a explanatory diagram showing the method for comparing the combined boundaries, the parts same as in FIG. 2 are given the same numerals. Namely, the drawing shows that the scanning 203 and 204 follows the scanning 21 shown in FIG. 2 and the mapping is performed. The PQRS area is mapped by the scanning 204. And by the scanning 204, a boundary 205, 206, 207 and 208 are generated.

In the embodiment 1, if the scanning in the X negative direction is performed after the scanning shown as in FIG. 15, it occurs that the pixel coordinates exists not only outside the boundary generated by the scanning 204 but also within the boundary generated by the scanning 21, and thereby the mapping is performed. And there is also a possibility to occur the same thing in case of the following: after reading up to the straight line LM by the scanning 21, the scanning in the X negative direction is performed a very little, but because of finding out the shortage of the reading up to the straight line LM the scanning in the X positive direction is performed again by the way.

At this time, since the boundary is changed to a new one section and the re-writing is performed by the scanning outside the new boundary, it causes to occur the deterioration of the picture quality. In order to avoid that, the boundaries of a plural sections generated so far may be arranged to be synthesized as to make the outline outside the overlapped boundary. In the embodiment 2, the boundary prior to this may also restricts the mapping in the X negative direction.

Figure 16:
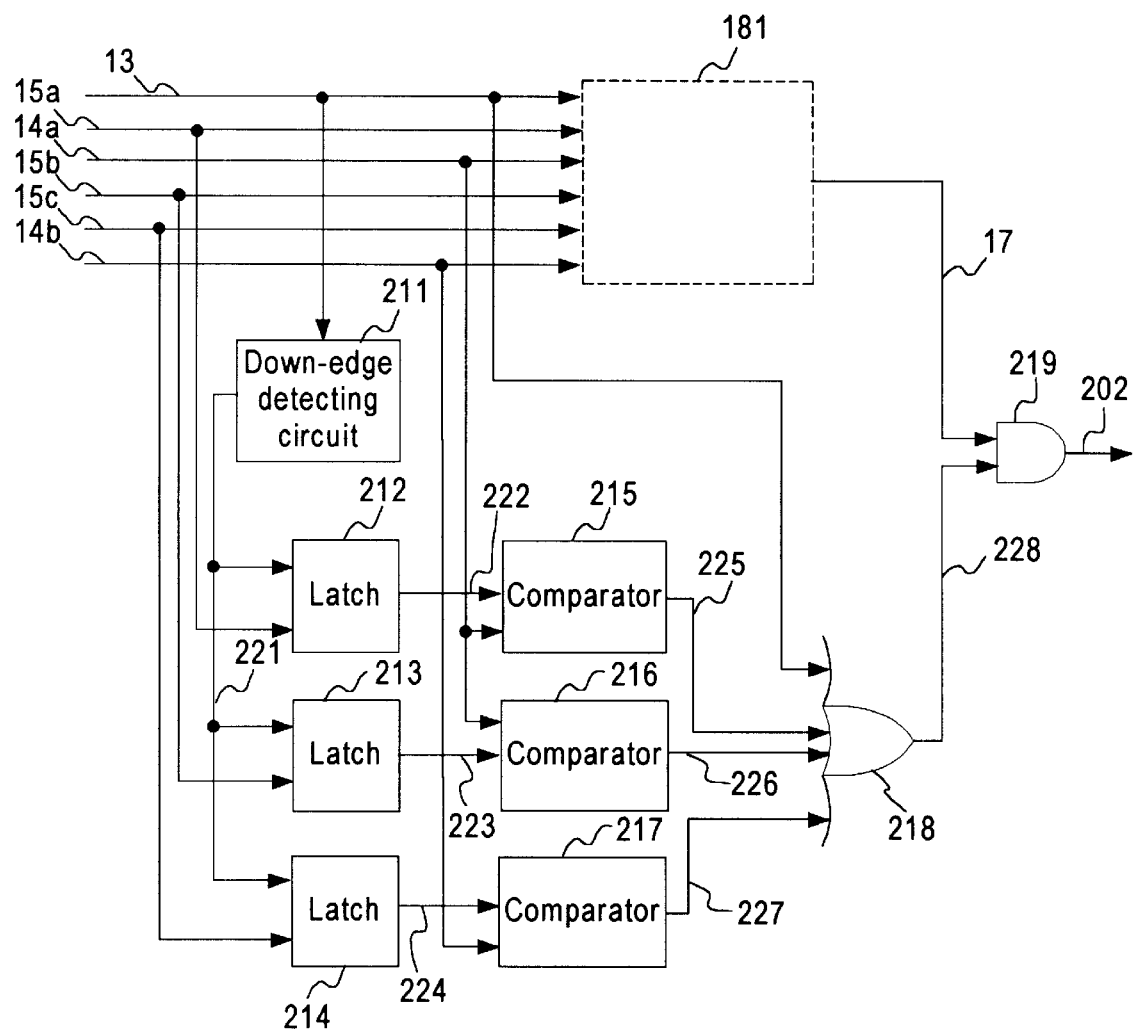
FIG. 16 is a block diagram showing an example of a combined boundary comparing circuit of first combined boundary comparing means.

FIG. 16 is a block diagram showing an example of a combined boundary comparing circuit of the first combined boundary comparing means 201 in FIG. 14.

The parts able to carry out by the same parts in the boundary comparing circuit in the embodiment 1 shown in FIG. 12 are given the same numerals. The parts added to the boundary comparing circuit are a down-edge detecting circuit 211, a latch 211 to 214, a comparator 215 to 217, an OR element 218, and an AND element 219.

The explanation only about the added parts will be described hereinafter.

The down-edge detecting circuit 211 detects the down-edge of the scanning direction signals 13 generated at the scanning timing of changing from the X positive direction to the X negative direction, and the down-edge detecting signals 221 outputted from the down-edge detecting circuit 211 are inputted to the latch 212 to 214.

The latch 212 to 214, when the down-edge of the scanning direction signals 13 are detected, hold the boundary signals 15a, 15b and 15c at the present step. Namely, the boundary signals of one section prior to the next scanning are to be held.

The comparator 215 to 217 compare the boundary signals 222 to 224 of one section prior to the next scanning which are held in the latch 212 to 214, with the position information 14a and 14b each other, and the compared result 225 to 227 are outputted to the OR element 218. Accordingly, the OR element 218 is to output the boundary comparing signals 228 which get high levels when the coordinates of the pixel to be mapped exist outside the boundary of one prior section or the scanning is performed in the X positive direction. Meanwhile, the boundary comparing circuit 181, which are executing the boundary comparing processing corresponding to the present scanning outputs the boundary comparing signals 17 corresponding to the present scanning.

Since the boundary comparing signals 17 corresponding to the present scanning and the boundary comparing signals 228 corresponding to the prior scanning are inputted to the AND element 219, in case of the scanning in the X positive direction or in case that the pixels to be mapped exist not only outside the boundary of a section corresponding to the present scanning and but also outside the boundary of a section corresponding to the prior scanning, combined boundary signals 202 with high levels are outputted in accordance with those signals. The combined boundary signals 202 control the mapping means 7 in the same way as the boundary comparing signals 17 in the embodiment 1. Namely, at the time of the scanning in the X positive direction, the pixel signals obtained from all pixels of the image reading sensor 51 are mapped, and besides at the time of the scanning in the X negative direction, the mapping is performed for the image data obtained from the pixels outside the combined boundary synthesizing the section corresponding to the present scanning and the section corresponding to the prior scanning.

In accordance with the above description, it is possible to perform the determination for the combined boundary, and control the mapping with more fine accuracy.

Embodiment 3

Figure 17:
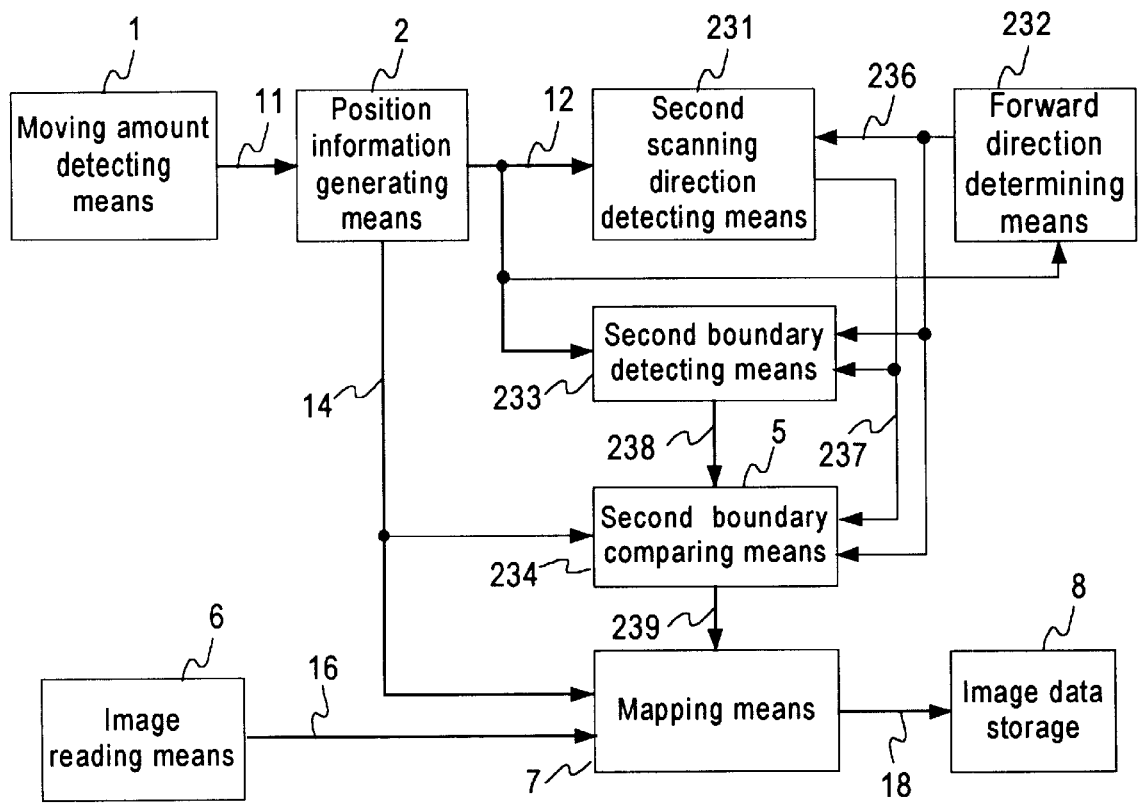
FIG. 17 is a block diagram of an image data reading apparatus in the embodiment 3 of the present invention.

FIG. 17 is a block diagram showing an image reading apparatus in the embodiment 3 of the present invention. The scanning from left to right (the X positive direction) in the above embodiments is defined as a forward direction, but that definition causes the following inconvenience. Accordingly in this embodiment the constitution is provided with forward direction determining means.

In FIG. 17, the image reading means 6 reads out the image data by the image reading sensor 51 of the free scanning apparatus, the moving amount detecting means 1 detects the moving amount of the free scanning apparatus, and the position information generating means 2 generates the position information of the image reading sensor 51 and the information of the mapped position for the image data in accordance with the moving amount detected by the moving amount detecting means 1, those steps are the same as in each prescribed embodiment.

Forward direction determining means 232 determines the forward direction of the free scanning apparatus according to the position information 12 outputted from the position information generating means 2, and second scanning direction detecting means 231 detects the scanning direction of the free scanning apparatus in accordance with the position information 12 of the image reading sensor 51 and forward signals 236 outputted from the forward direction determining means 232.

Second boundary detecting means 233 generates a boundary for limiting the mapping in accordance with the position information 12 of the image reading sensor 51, scanning direction signal 237 outputted from the second scanning direction detecting means 231, and the forward signal 236. And second boundary comparing means 234 compares boundary signals 238 outputted from the second boundary detecting means 233 with the position information 14 of the pixels to be mapped according to the forward signals 236, when the scanning direction signals 13 are determined as the scanning in the reverse direction (an opposite direction against the forward), the compared result is available for limiting the mapping The mapping means 7 performs the mapping of the image data 16 into the image data storage 8 using the position information 14 of each pixel, and at the same time makes a limitation on the mapping using boundary comparing signals 239 (including the information of the scanning direction) of the second boundary comparing means 234.

Figure 28:
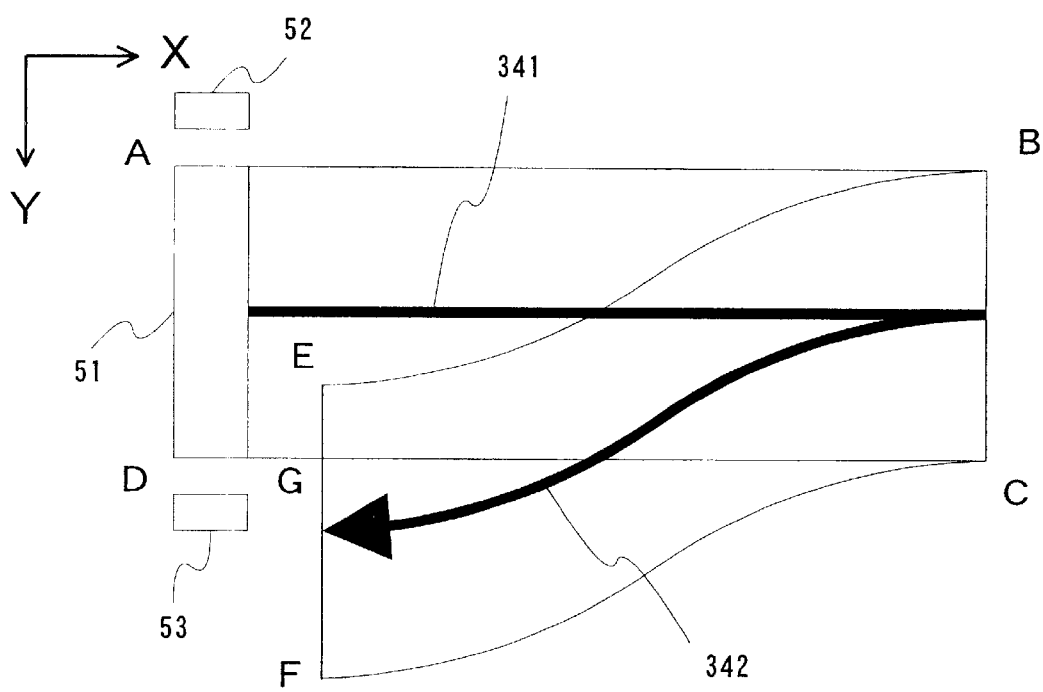
FIG. 28 is an explanatory diagram showing an example of a reading method for originals.
Figure 29:
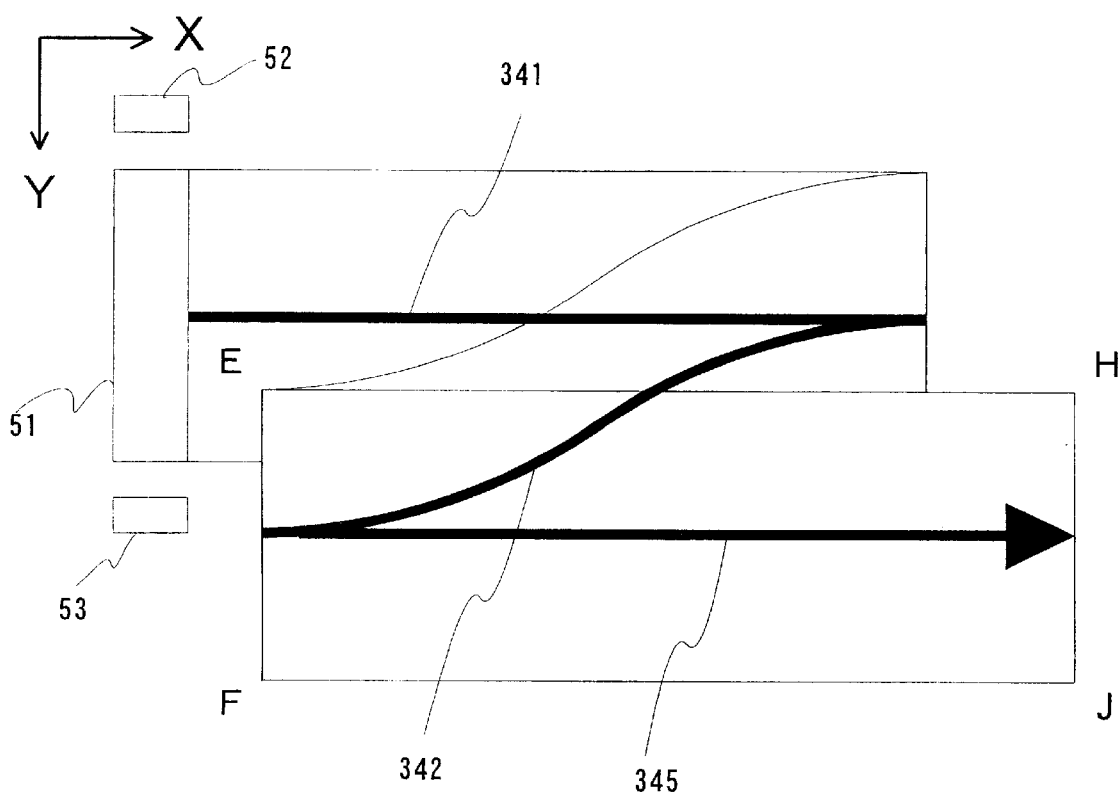
FIG. 29 is an explanatory diagram showing the other example of a reading method for originals.
Figure 30:
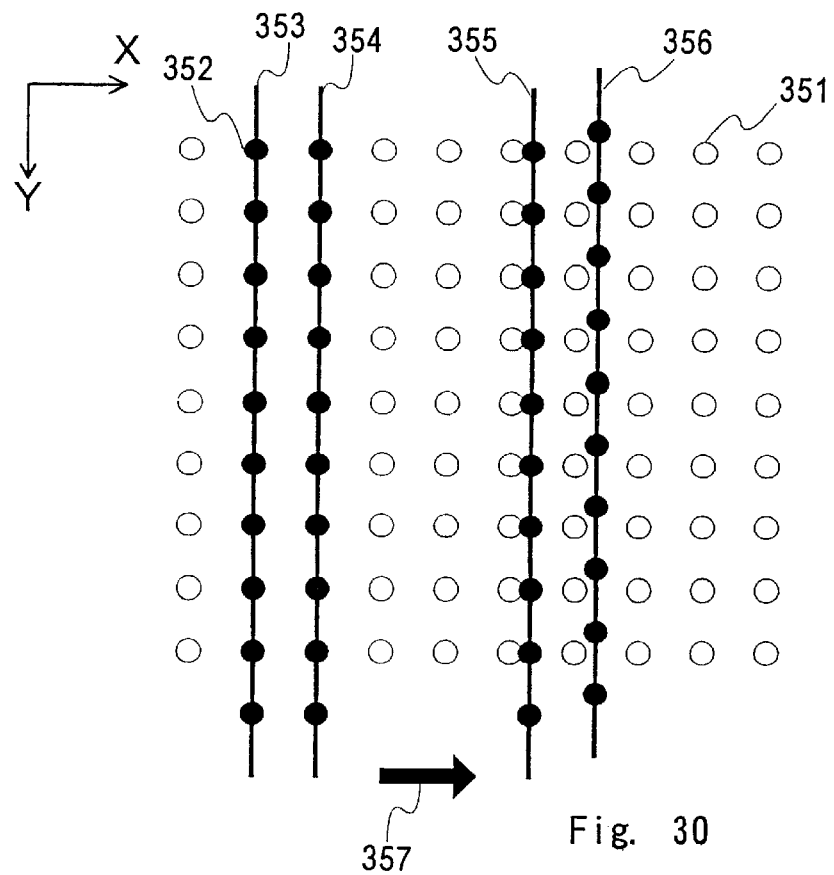
FIG. 30 is an explanatory diagram showing an example of the mapping errors.
Figure 31:
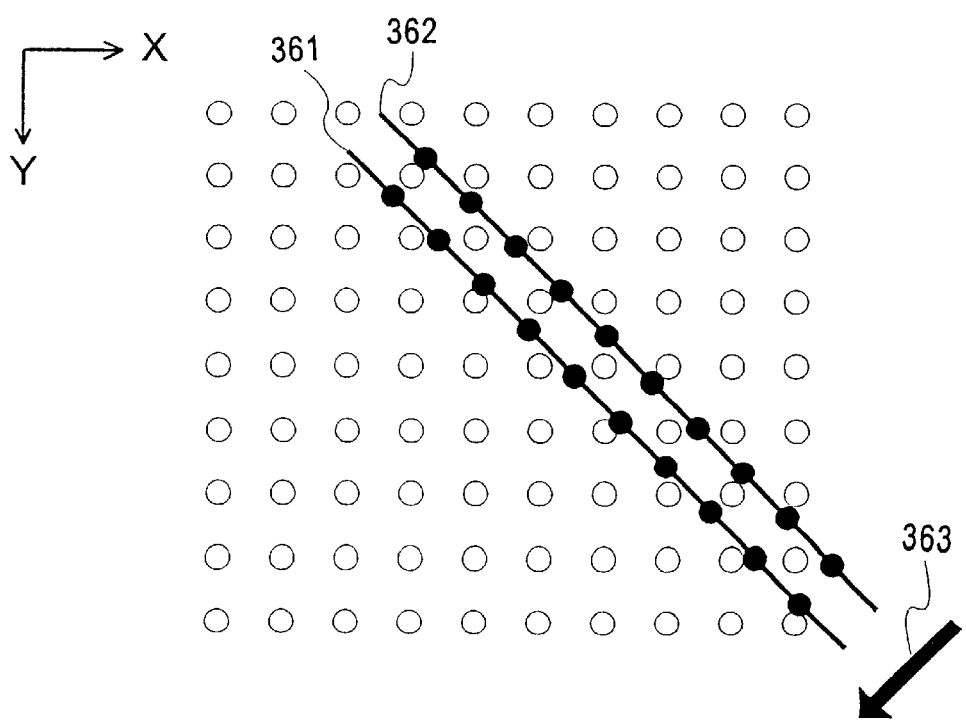
FIG. 31 is an explanatory diagram showing the other example of the mapping errors.
Figure 32:
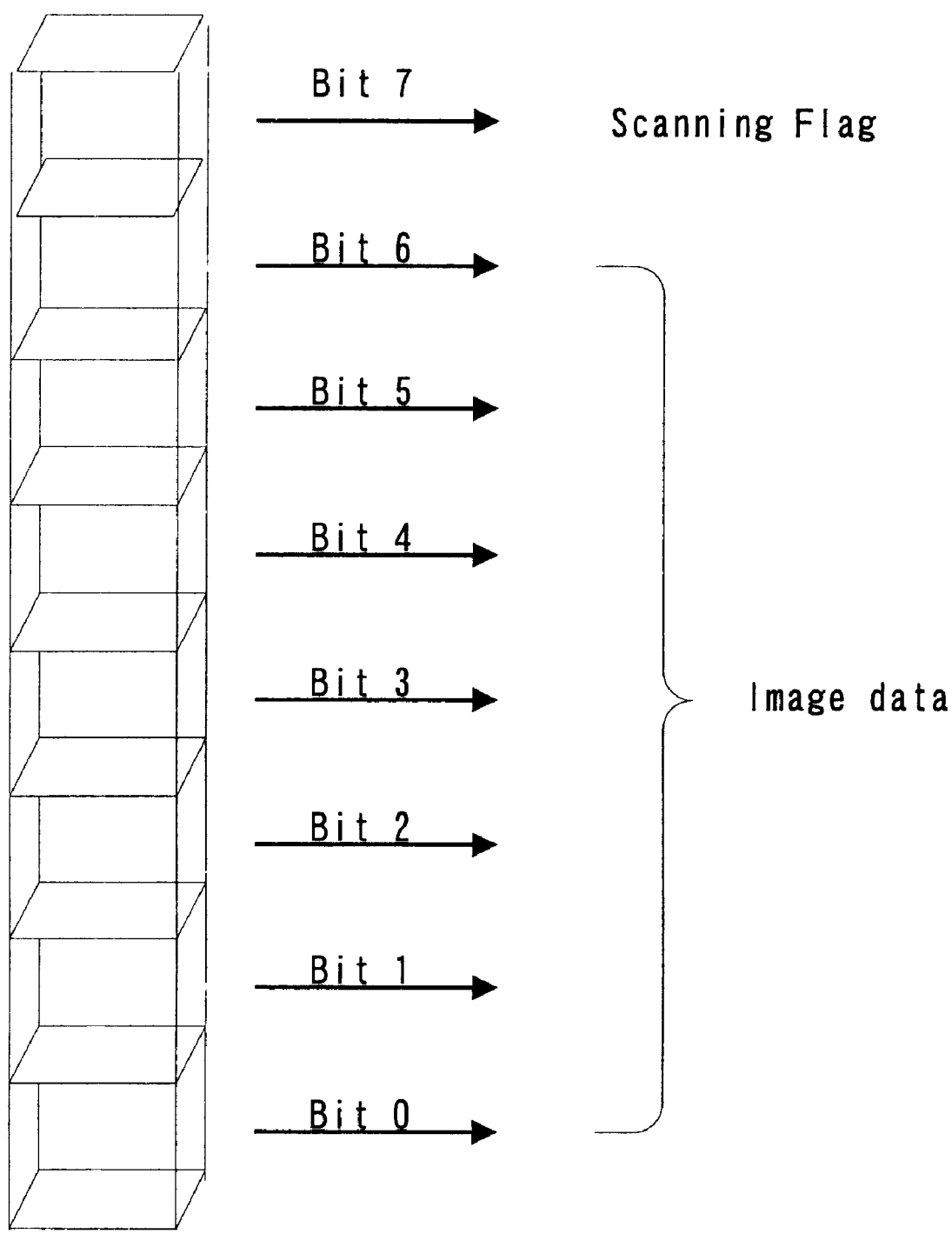
FIG. 32 is an explanatory diagram of a scanning flag.

The reason that the construction is provided with the forward direction determining means 232 is as follows: namely, it is arranged in FIG. 28 that the scanning in the X positive direction moves on almost the straight line while the scanning 342 in the X negative direction is inclined to move in a slant direction. Accordingly the scanning method is defined that the free scanning apparatus moves from left to right almost in a straight line direction first, and then moves zigzag downward. Though it is possible to force an user to read out originals by the scanning in that way, each user has a habit or an individuality such as a right-hander or a left-hander, if the habits or individualities are taken into consideration, it is preferable to be able to read out even if the scanning starts from the reverse direction. Namely, the reading method is that, first the free scanning apparatus moves and read from right to left, and then the scanning from the right to left is performed in the right-slant-downward direction.

The method to carry out the above is to detect the first moving direction, which is defined as the forward direction, and the scanning in the forward direction is given a priority to be mapped. At this time, it is impossible to carry out the method by using each means under only the condition of defining the X forward direction as the forward direction. That will be described referring to FIG. 2.

FIG. 2 is an explanatory diagram of the boundary detecting method described before. Assuming that the scanning 26 shown as an arrow in the drawing is performed, where the direction of the scanning 26 is defined as the forward direction, the boundary 25 of the starting point X for scanning of one section is determined by the coordinates of one end point L and the other end point M (an element of one end and an element of the other end) of the image reading sensor 51 composing the free scanning apparatus. That is, the boundary 25 gets to be a straight line vertical against the X axis passing through the smaller value of the X coordinate of the point L or the point M. That is different from using the large value of the X coordinate of the point K or the point N, in case of defining the scanning 21 as the forward direction. Therefore, it is necessary to change the processing according to whether the X positive direction is defined as the forward direction or the X negative direction.

Figure 18:
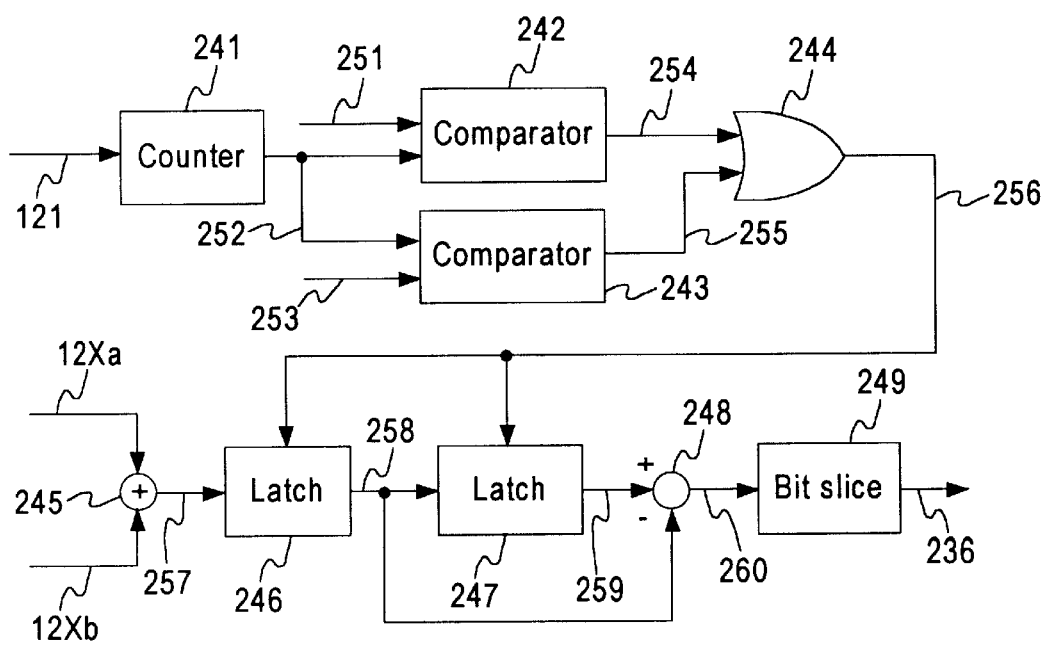
FIG. 18 is an explanatory diagram for a forward direction determined circuit of forward direction determining means.

FIG. 18 is a block diagram showing an example of a forward direction determined circuit composing the forward direction determining means 232 in FIG. 17.

The forward direction determined circuit is provided with a comparator 242 and 243, an OR element 244, an adder 245, a latch 246 and 247, a subtracter 248, and a bit slice 249. The forward direction determined circuit finds the center of the image reading sensor 51 moving in the X positive direction or in the X negative direction between the starting position for the scanning and the scanned specified lines, and the direction thus detected is defined as a forward direction The counter 241 counts up the line synchronous signals 121, and the counted value 252 is compared with each specific value 251 and 253 by the comparator 242 and 243 respectively. It is preferable that the specific value 251 and 253 are about a value "1" and a value "16" respectively.

The comparator 242 outputs the signals 254 to be high levels when the specific value 251 is coincident with the counted value 252, meanwhile the comparator 243 outputs the signals 255 to be high levels when the specific value 253 is coincident with the counted value 252.

The OR element 244 makes latch enable signals 256 high levels when at lease either one of the signals 254 or signals 255 are high levels.

The position information 12Xa and 12Xb corresponding to the X coordinate of the elements at both ends of the image reading sensor 51 are inputted to the adder 245, the added result 257 is stored in the latch 246 when the latch enable signals 256 are high levels, and the output 258 of the latch 246 is also stored in the latch 247 when the latch enable signals 256 are high levels.

Therefore, when the counter 241 counts up "1", the latch 246 holds the added result 257. Besides, when the counter 241 counts up "16", the latch 247 holds the added result corresponding to the count "1" and the latch 246 holds the added result corresponding to the count "16".

The subtracter 248 is to subtract the output signals 258 of the latch 246 from the output 259 of the latch 247. When the scanning is performed in the X positive direction, the output of the subtracter 248 is negative. Conversely when the scanning is performed in the X negative direction, the output is positive. Accordingly, the most significant bit, which is extracted by the bit slice 249, becomes high levels when the scanning is performed in the X positive direction, otherwise when the scanning is performed in the X backward direction the output becomes low levels. Therefore, it is possible to determine the forward direction by the first scanning for ten or more lines.

Furthermore, it may be arranged to use a timer instead of the forward direction counter 241, and to set up the specific time at the comparator 242 and 243.

If the forward direction is determined as above, it is not sufficient that only the X positive direction is detected by the scanning direction detecting means as described in the embodiment 1 (FIG. 8).

Figure 19:
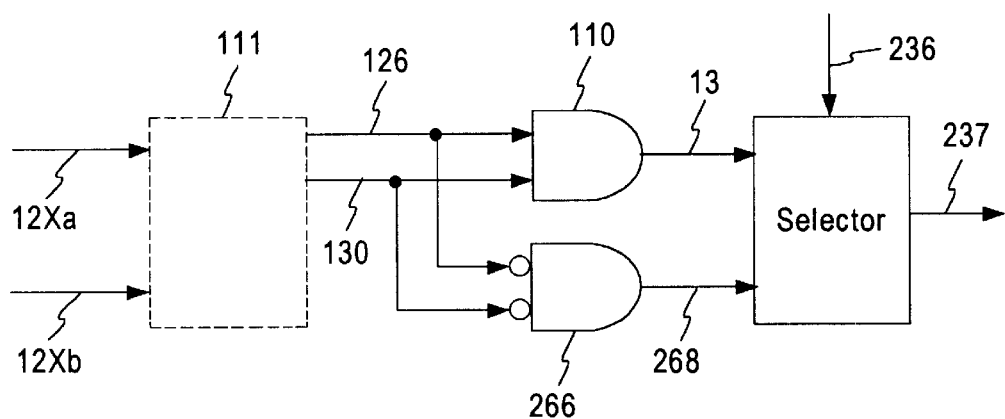
FIG. 19 is a block diagram showing an example of a scanning direction detecting circuit of second scanning direction detecting means.

FIG. 19 is a block diagram showing an example of the scanning direction detecting circuit of the second scanning direction detecting means 231 in FIG. 17. A dot line portion 111 is equivalent to the scanning direction detecting circuit shown in FIG. 8. The difference from the scanning direction detecting circuit is the addition of a logical element 266 (NOR element) and a selector 267. Since the parts of the dot line portion 111 and the AND element 110, that is, the constitution of outputting the signals 13, are operated in the same way as of the scanning direction detecting circuit in FIG. 8, the explanation will not given here.

The signals 126 become high levels as above because one end of the image reading sensor 51 moves in the X positive direction, and when the other end of the image reading sensor 51 of the free scanning apparatus moves in the X positive direction, the signals 130 become high levels. Accordingly, the logical element 266 outputs the high level signals 268 because the both ends of the image reading sensor 51 moves in the direction reverse to X.

The selector 267 selects the signals 13 or the signals 268 according to the forward direction signals 236. In other words, the signals 13 are selected if the forward is the X positive direction, otherwise the signals 268 are selected if the forward is the X negative direction. In the constitution shown in FIGS. 8 and 19, although the forward direction is the X negative direction even when one end of the image reading sensor 51 does not change the position, it may be arranged to exclude that case.

Figure 20:
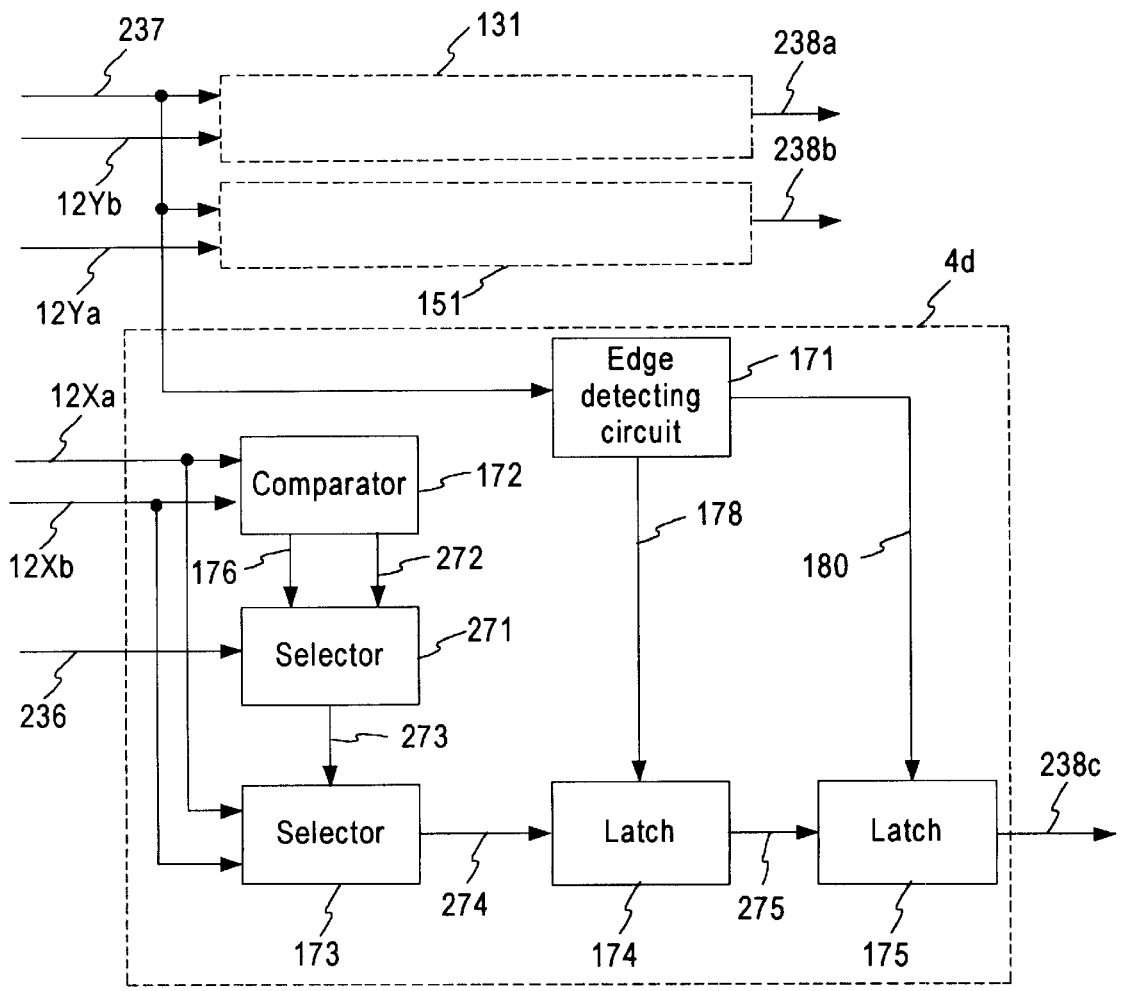
FIG. 20 is a block diagram showing an example of a boundary detecting circuit 4d of second boundary detecting means.

FIG. 20 is a block diagram showing an example of a boundary detecting circuit 4d of the second boundary detecting means 233 in FIG. 17. Assuming that the X negative direction can be the forward direction, it is necessary to also reflect it on the first boundary detecting circuit 4c shown in FIG. 11. Therefore, it is arranged that the constitution is provided with a selector 271.

But the operation of the other parts is the same as in the boundary detecting circuit 4c, and the explanation will not described here.

The selector 271 selects in accordance with the forward direction signals 236 either the compared result 176, which is a result that the comparator 172 compares the X coordinates of both ends of the image reading sensor 51 at the scanning starting point of one section respectively, or the signals 272 reflecting the compared result.

As explained referring to FIG. 2, in case that the forward is the X positive direction, the larger X coordinate is selected from the X coordinates at the scan starting position of the both ends of the image reading sensor 51, but if the forward is the X negative direction, it is necessary to select the smaller one. Therefore, the selector 271 selects the signals 176 when the forward is the X positive direction, otherwise the signals 272 are selected when the forward is the X negative direction. Thereby, the boundary signals 238c can be obtained, which corresponds to the boundary 24 when the X positive direction is forward, but corresponds to the boundary 25 when the X negative direction is forward. The boundary signals 238a, 238b and 238c in FIG. 20 are to correspond to the boundary signals 15a, 15b and 15c in FIG. 11 respectively.

Figure 21:
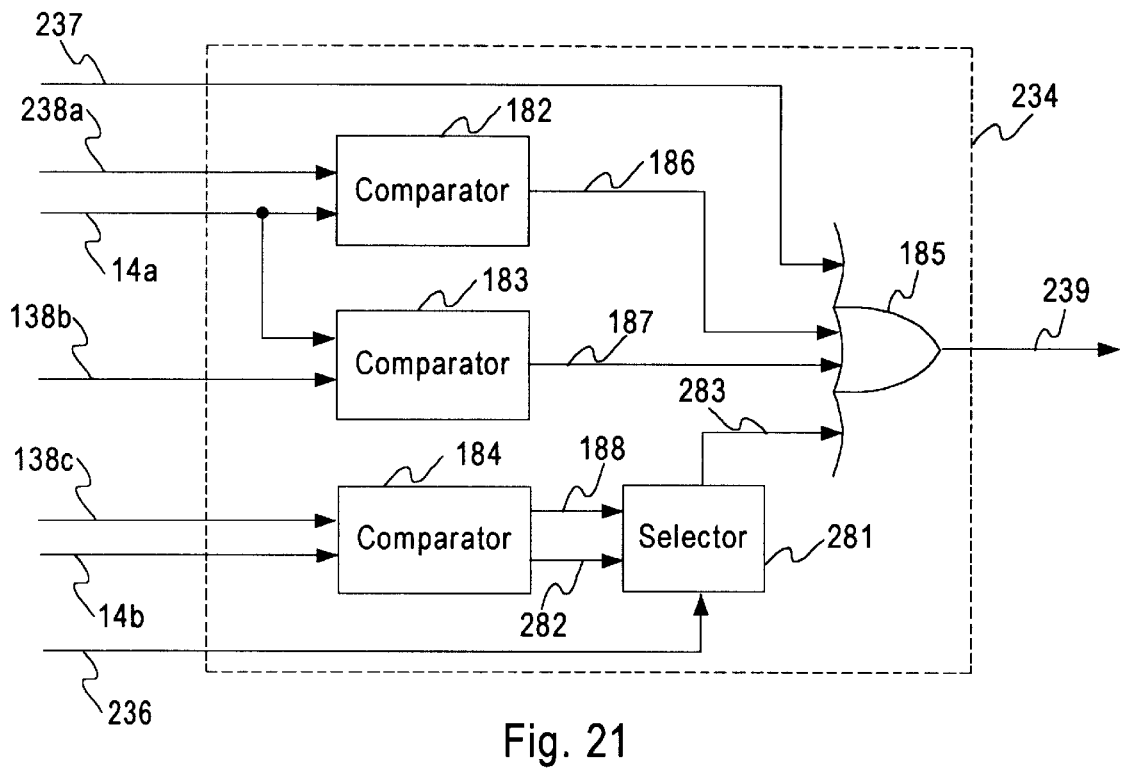
FIG. 21 is a block diagram showing an example of a boundary comparing circuit of second boundary comparing means.

FIG. 21 is a block diagram showing an example of the boundary comparing circuit of the second boundary comparing means 234 in FIG. 17. The fact that the X direction in any case of negative or positive can be the forward must be reflected on the boundary comparing means 224 in FIG. 12. Therefore, it is arranged that the constitution is provided with a selector 281.

Here is explained Referring to FIG. 2. When the forward direction is the X positive direction, the mapping is performed for the pixels having the X coordinate smaller than one of the boundary 24. But when the forward direction is the X negative direction, the mapping is performed for the pixels having the X coordinate larger than one of the boundary 25. In other words, the requisites for the mapping are different according to the direction of the forward. Therefore, the selector 281 is controlled by the forward direction signals 236. And if the forward direction signals 236 represent that the X positive direction is the forward, the selector 281 selects the compared result 188 of the comparator 184 (the signals changing high levels when each X coordinate is smaller than the boundary 24), meanwhile if the X negative direction is the forward, selects the compared result 282, that is a inverse signals of the compared result signals 188 (the signals changing high levels when each X coordinate is larger than the boundary 25). The selected result 283 is inputted to the OR element 185.

Since the image reading apparatus in the present invention comprises the forward direction determining means 232 as described above, not only when the original is first read by the linear scanning of the free scanning apparatus from left to right direction, but also when the original is first read by the linear scanning from right to left direction, the scanning with high quality and high speed becomes able to carry out.

And since the image reading apparatus in this embodiment performs the mapping processing with generating boundaries instead of using the scanning flag for confirming if the mapping has been performed, the scanning with high quality and high speed becomes able to carry out.

Embodiment 4

Figure 22:
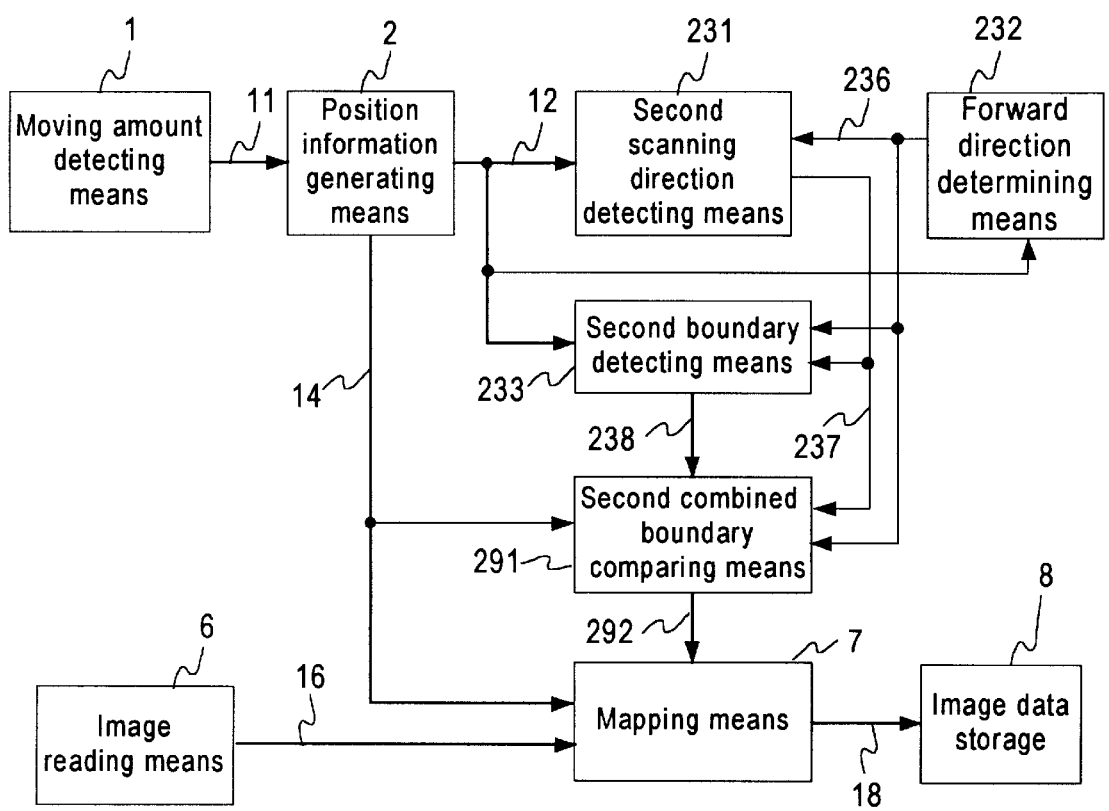
FIG. 22 is a block diagram of an image data reading apparatus in the embodiment 4 of the present invention.

FIG. 22 is a block diagram showing an example of the image reading apparatus in the embodiment 4 of the present invention If the forward direction signals 236 obtained from the forward direction determining means should be reflected in the embodiment 2 comprising the combined boundary comparing means shown in FIG. 14, the constitution is arranged as follows. The constitution in this embodiment is arranged to be provided with second combined boundary comparing means 291 in stead of the second boundary comparing means 234 of the embodiment 3 in FIG. 17, and the other parts are operated in the same way as of the image reading apparatus in the embodiment 3. Accordingly the explanation is not given here.

Figure 23:
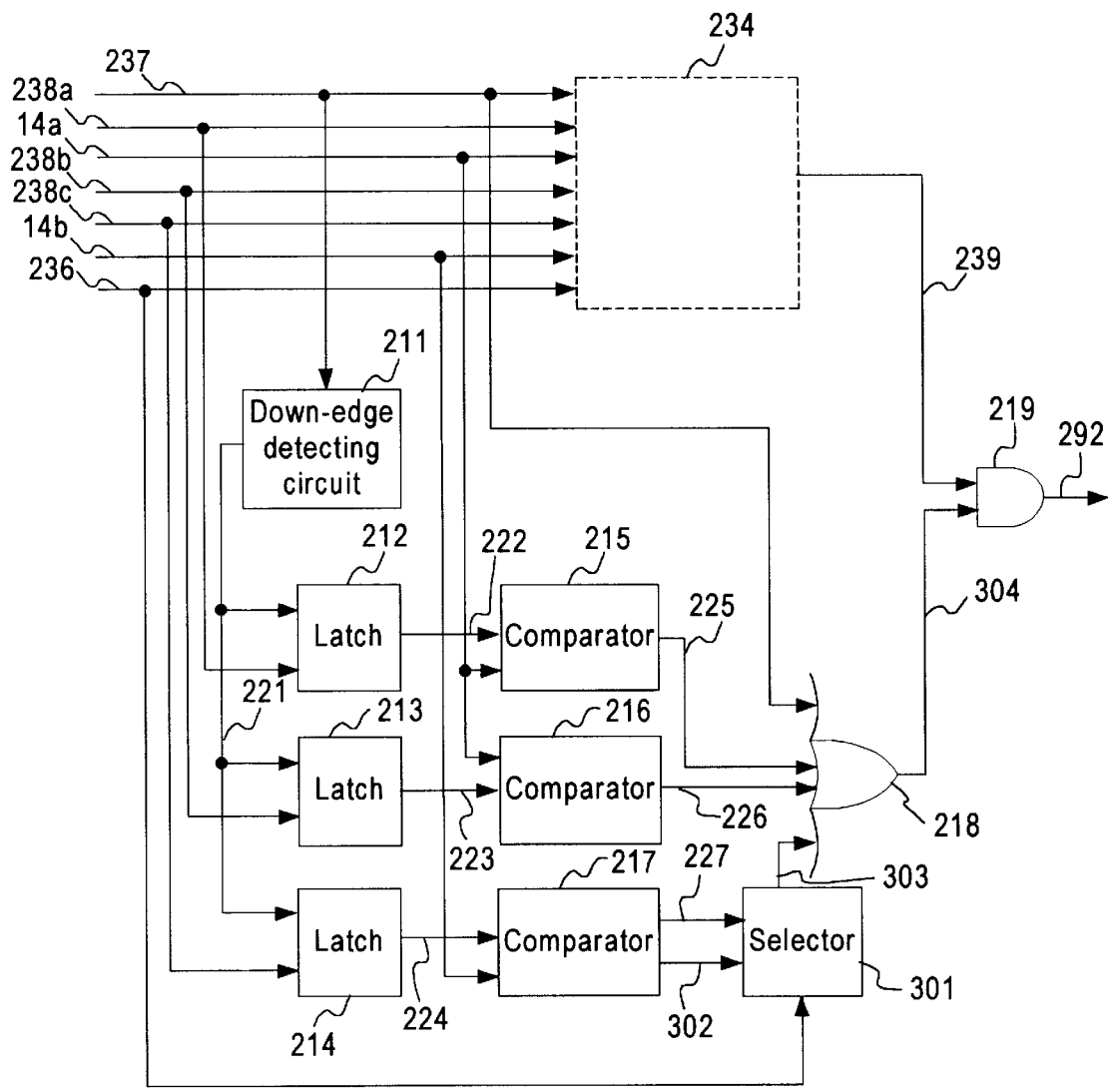
FIG. 23 is a block diagram showing an example of a combined boundary comparing circuit of second combined boundary comparing means.

The second combined boundary comparing means 291 is arranged to determine to perform the mapping or not according to the boundary signals of a plural sections as same as the first combined boundary comparing means 201 in FIG. 14. By comparing with the boundaries of a plural sections, it is possible to improve the scanning operation and the picture quality. In FIG. 23, boundary comparing signals 304 reflects the compared result of the X coordinates of each element of the image reading sensor 51 and boundary signals 15c at the time of outputting the down-edge signals, of which conditions are changeable according to contents of the forward direction signals 236.

FIG. 23 is a block diagram showing an example of the combined boundary comparing circuit of the second combined boundary comparing means 291 in FIG. 22. The difference from the prescribed combined boundary comparing circuit in FIG. 16 are that the boundary comparing circuit 234 explained in FIG. 21 is replaced by a boundary comparing circuit 181, and that a selector 301 is furnished. The explanation about the boundary comparing circuit 234 is the same as the above, and the operation of the selector 301 is the same as the selector 281 in FIG. 21, therefore here is explained in brief.

The comparator 217 compares the position information 14X of each element of the image reading sensor 51 and the output signals 224 of the latch 214 holding the boundary signals 238c of the prior section, and outputs the compared result 227 and the reverse signals 302. The selector 301 selects the signals 227 if the forward direction signals 236 define the X positive direction as the forward, otherwise the signals 302 if the X negative direction is defined as the forward, and then outputs the selected result 303 to OR element 218. Accordingly, even if the X negative direction is defined as the forward, it it possible to do the comparison of the combined boundaries.

And since the image reading apparatus in this embodiment performs the mapping processing with generating boundaries instead of using the scanning flag for confirming if the mapping has been performed, the scanning with high quality and high speed becomes able to carry out.

Embodiment 5

The mapping area of the image data as shown in the embodiment 1 is controlled by the determination whether the scanning is performed in the X forward direction or not. And it can be controlled by the slant angle of the image reading apparatus as follows.

Namely, it is preferable to restrict the scanning direction to a certain extent so as to obtain the image data with high quality, for instance, in the way that the mapping processing is controlled by detecting the scanning direction as described in the embodiments 1 to 4. Conversely, in case of the special scanning without suiting to the scanning method described above, it is impossible to improve the picture quality.

FIG. 25 is an explanatory diagram showing an example of the special scanning. When the scanning of the first section is a curvilinear scanning as shown in FIG. 25(a), the curvilinear scanning is defined as becomes the forward direction so that the linear scanning in reverse direction cannot be available for the mapping preferentially. And it occurs as shown in FIG. 25(b) that the forward direction and the backward direction of the linear scanning may change each other on the way. It is slant scanning detecting means 311 that can perform those special scanning effectively, which is described hereinafter.

FIG. 24 is a block diagram of the image reading apparatus in the embodiment 5 of this invention.

In FIG. 24 like the prescribed embodiments, the image reading means 6 reads the image data by the image reading sensor 51 of the free scanning apparatus, the moving amount detecting means 1 detects the moving amount of the free scanning apparatus, and the position information generating means 2 generates the position information 12 of the image reading sensor 51 and the information of the mapping position of the image data 16 in accordance with the moving amount detected by the moving amount detecting means 1.

The slant scanning detecting means 311 detects the grade to the reference position of the free scanning apparatus (the image reading sensor 51) according to the position information of the image reading sensor 51.

Third boundary detecting means 312 generates the boundaries for restricting the mapping in accordance with the position information 12 of the image reading sensor 51 and slant scanning signals 314 outputted from the slant scanning detecting means 311. And third boundary comparing means 313 compares boundary signals 315 outputted from the third boundary detecting means 312 and the position information 14 of each pixel to be mapped, and the compared result is used for restricting the mapping if the scanning is determined as the slant scanning according to the slant scanning signals 314.

The mapping means 7 maps the image data 16 on the image data storage 8 in accordance with the position information 14 of each pixel. At this time, the mapping means 7 restricts the mapping using the boundary comparing signals 316 (reflecting the slant information) of the third boundary comparing means 313.

The third boundary detecting means 312 can be replaced by the first boundary detecting means 4 and the third boundary comparing means 313 can be replaced by the first boundary comparing means 5. At this time, each means is arranged to be operated using the slant scanning signals 314 outputted from the slant scanning detecting means 311 in stead of the scanning direction signals 13 outputted from the first scanning direction detecting means 3.

And the other means can be carried out by the same in the embodiment 1, which will not be described here.

Figure 26:
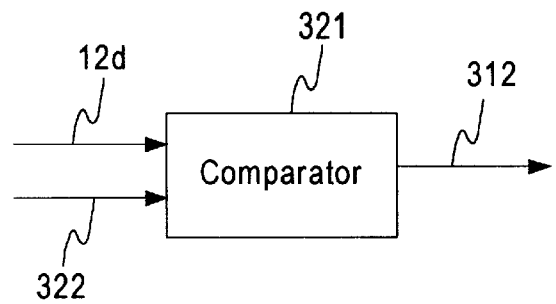
FIG. 26 is a block diagram showing an example of a slant scanning detecting circuit of slant scanning detecting means.

FIG. 26 is a block diagram showing an example of a slant scanning detecting circuit of the slant scanning detecting means 311. The slant scanning detecting circuit can be carried out by a comparator 321. In other words, the ΔX value 12d as the increase or decrease of the X coordinate between each element of the image reading sensor 51 outputted from the position information generating means 2 (see the equation (3) for the calculation methods, and the ΔX is an absolute value here) is inputted to a comparator 321.

The ΔX value 12d is compared with a specific value 322, where it is smaller (larger) than the specific value 322, the comparator 321 changes slant scanning signals 312 to high levels (low levels) and then outputs them Namely, the ΔX value 12d larger than the specific value 322 means that the free scanning apparatus slants big against the reference position.

As illustrated in FIG. 24, slant scanning signals 314 outputted from the slant scanning means 311 is inputted to the third boundary detecting means 312 and the third boundary comparing means 313. In the third boundary detecting means 312 and the third boundary comparing means 313, the slant scanning signals are handled in the same way as the scanning direction signals so that the boundary comparing signals 316 can be obtained.

And if the switching of the slant scanning signals to high levels or low levels is performed by two threshold values, which are not shown in drawings, it is possible to avoid changing frequently the slant scanning signals because of a delicate slant. In concrete, two comparator compares a maximum threshold value and a minimum threshold value. When the ΔX is over the maximum threshold value, high level signals are outputted, but when the ΔX is under the minimum threshold value, low level signals are outputted. And the compared results may be arranged to control the slant scanning signals 314 as each input signal for set or reset of a RS flip-flop.

Under the above constitution, if the grade of the free scanning apparatus is small, the image data of all pixel obtained by the image reading sensor 51 is mapped in the image data storage 8, otherwise if the grade is over the specific value, only the image data of pixels outside the specific boundary is mapped on the image data storage 8. Therefore, it is possible to prevent the deterioration of the image data. And like each embodiment described above, the image reading apparatus in this embodiment performs the mapping processing with generating boundaries instead of using the scanning flag for confirming if the mapping has been performed, therefore the scanning with high quality and in high speed becomes able to carry out.

Embodiment 6

Figure 27:
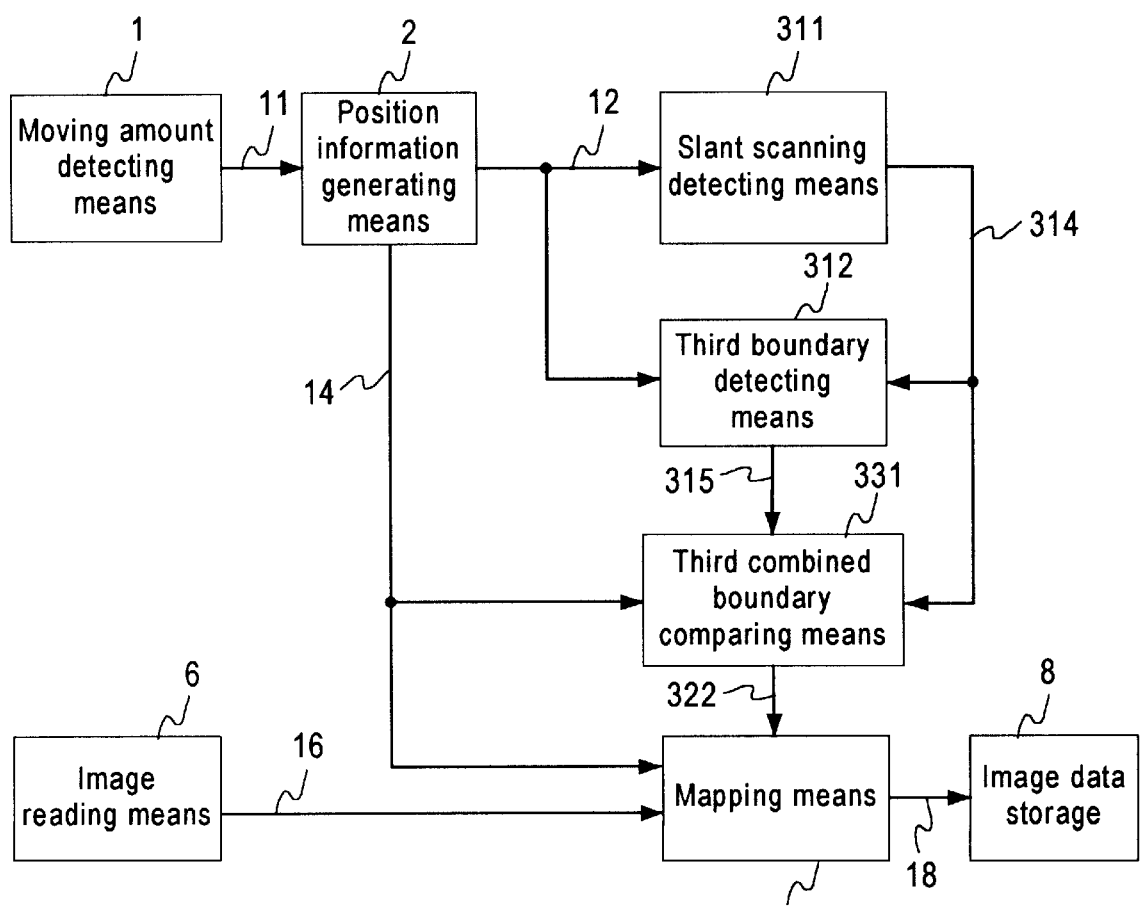
FIG. 27 is a block diagram of an image data reading apparatus in the embodiment 6 of the present invention.

FIG. 27 is a block diagram of an image reading apparatus in the embodiment 6 of the present invention. The embodiment 6 shows a case that slant detecting signals are used in the embodiment 2 comprising the combined boundary comparing means, and slant scanning detecting means 311 is used instead of the scanning direction detecting means 3 in FIG. 14, third combined boundary comparing means 331 is used in stead of the third boundary comparing means 313 in the embodiment 5 shown in FIG. 24. Since the third combined boundary comparing means 331 can be carried out by the same circuit as the first combined boundary comparing means 201 in FIG. 14, the explanation will not be described here.

Though the MPU is arranged to be used as the position information generating means 2 in the above embodiments 1 to 6 of the present invention, it is possible to carry out the invention by DSP (Digital Signal Processor).

In this embodiment, it is possible to determine the area for mapping in accordance with the grade of the free scanning apparatus. Accordingly, since the mapping processing is performed by generating boundaries instead of using the scanning flag for confirming if the mapping has been performed, it is possible to perform the mapping with high quality and high speed.

And it is arranged that the calculation is made by the software such as MPU, but it is possible to be processed either by the hardware only or by the software only.

And the latches are used in the above description, but it is needless to say that it may be arranged to use flip-flops instead of each latches.

In the above description, it is arranged that the mapping may be performed for the image data obtained outside the boundary at the time of the scanning in the X negative direction (the reverse direction, or at the time of the grade larger than the specific value of the free scanning apparatus. But the method for generating the boundary can be available to various ways. For instance, one is for performing the mapping of the image data obtained inside the boundary in case of the scanning in the X positive direction (the forward direction), or in case of the grade smaller than the specific value of the free scanning apparatus. And the other is that, in case of the combined boundary, that is, in case that the section of the prior scanning is overlapped with the section of the next scanning, the image data by the prior scanning may be applied to the upper side from the boundary while the image data by the next scanning may be applied to the under side from the boundary.

What is claimed is:

1. An image data reading method for generating image data by image reading means in accordance with signals detected by a plurality of reading elements set in an array on an image reading sensor of a free scanning apparatus able to scan an original in arbitrary direction, said image data corresponding to each reading element, calculating position information corresponding to said each image data by position information generating means according to a moving amount of the free scanning apparatus, and mapping said each image data in image data storage means according to the position information, and where a read starting position represents a reference position, the reading elements arraying direction of the image reading sensor at the reference position is defined as a Y axis, and a direction vertical to the Y axis as a X axis, said method comprising the steps of:

generating a boundary vertical to at least either one of the X axis or the Y axis within a mapping area in accordance with the position information of one or both ends of the image reading sensor generated by the position information generating means when the free scanning apparatus scans for a section in the X positive direction, and mapping only a part outside the boundary generated by the one section scanning when the free scanning apparatus scans in the X negative direction.

2. The image data reading method defined in claim 1, wherein a combined boundary is generated synthesizing boundaries of a plural sections by repeating the aforementioned scanning, and when the free scanning apparatus scans in the X negative direction, only a part outside the combined boundary is mapped.

3. The image data reading method defined in claim 1, wherein the scanning in the X negative direction includes that one end of the image reading sensor moves in the X positive direction and the other end moves in the X negative direction.

4. The image data reading method defined in claim 1, wherein the boundary includes a boundary which is generated in vertical to the Y axis in accordance with a minimum value of Y coordinate, within the scanning for one section, of an end of the sensor having a larger value of Y coordinate at the reference position than the other end.

5. The image data reading method defined in claim 1, wherein the boundary includes a boundary which is generated in vertical to the Y axis in accordance with a maximum value of Y coordinate, within the scanning for one section, of an end of the sensor having a smaller value of Y coordinate at the reference position than the other end.

6. The image data reading method defined in claim 1, wherein the boundary includes a boundary which is generated in vertical to the X axis in accordance with a lager value of X coordinate of an end of the sensor at the scan starting position within the one section than the other end.

7. The image data reading method defined in claim 1, wherein a determination of the scanning direction of the free scanning apparatus is performed if the scanning is over a specific moving amount or over a specific time for reading.

8. An image data reading method for generating image data by image reading means in accordance with signals detected by a plurality of reading elements set in an array on an image reading sensor of a free scanning apparatus able to scan an original in arbitrary direction, said image data corresponding to each reading element, calculating position information corresponding to said each image data by position information generating means according to a moving amount of the free scanning apparatus, and mapping said each image data in image data storage means according to the position information, and where a read starting position represents a reference position, the reading elements arraying direction of the image reading sensor at the reference position is defined as a Y axis, and a direction vertical to the Y axis as a X axis, and a forward direction of the scanning is detected according to the moving amount in the X axis direction for a specific section of the free scanning apparatus, said method comprising the steps of:

generating a boundary vertical to at least either one of the X axis or the Y axis within a mapping area in accordance with the position information of one or both ends of the image reading sensor generated by the position information generating means when the free scanning apparatus scans in the forward direction for a section, and mapping only a part outside the boundary generated by said one section scanning when the free scanning apparatus scans in the reverse direction.

9. The image data reading method defined in claim 8, wherein a combined boundary is generated synthesizing boundaries of a plural sections by repeating the aforementioned scanning, and when the free scanning apparatus scans in the reverse direction, only a part outside the combined boundary is mapped.

10. The image data reading method defined in claim 8, wherein the scanning in the reverse direction includes that one end of the image reading sensor moves in the X positive direction and the other end moves in the X negative direction.

11. The image data reading method defined in claim 8, wherein the boundary includes a boundary which is generated in vertical to the X axis in accordance with a smaller value of X coordinate of one end of the sensor at the scan starting position in the X negative direction within the one section than the other end.

12. An image data reading method for generating image data by image reading means in accordance with signals detected by a plurality of reading elements set in an array on an image reading sensor of a free scanning apparatus able to scan an original in arbitrary direction, said image data corresponding to each reading element, calculating position information corresponding to said each image data by position information generating means according to a moving amount of the free scanning apparatus, and mapping said each image data in image data storage means according to the position information, and where a read starting position represents a reference position, the reading elements arraying direction of the image reading sensor at the reference position is defined as a Y axis, and a direction vertical to the Y axis as a X axis, said method comprising the steps of:

detecting a slant of the free scanning apparatus against the reference position in accordance with the position information of both ends of the image reading sensor generated by the position information generating means when the free scanning apparatus scans, generating a boundary vertical to either one of the X axis or the Y axis within a mapping area of one section when the slant value is under a specific value, and mapping only the part outside the boundary when the slant value is over the specific value.

13. The image data reading method defined in claim 12 wherein a combined boundary is generated synthesizing boundaries of a plural sections by repeating the aforementioned scanning, and when the slant value is larger than the specific value, only a part outside the combined boundary is mapped.

14. The image data reading method defined in claim 12, wherein, when the slant value of the free scanning apparatus is detected, the slant information over a maximum threshold value is determined as it is larger than the specific value, the slant information under a minimum threshold value is determined as it is smaller than the specific value.

15. An image data reading method for generating image data by image reading means in accordance with signals detected by a plurality of reading elements set in an array on an image reading sensor of a free scanning apparatus able to scan an original in arbitrary direction, said image data corresponding to each reading element, calculating position information corresponding to said each image data by position information generating means according to a moving amount of the free scanning apparatus, and mapping said each image data in image data storage means according to the position information, and where a read starting position represents a reference position, the reading elements arraying direction of the image reading sensor at the reference position is defined as a Y axis, and a direction vertical to the Y axis as a X axis, said method comprising the steps of:

generating a boundary vertical to at least either one of the X axis or the Y axis within a mapping area in accordance with the position information of one or both ends of the image reading sensor generated by the position information generating means when the free scanning apparatus scans in the X positive direction for one section, and performing a processing for an image data obtained from one side of the boundary different from that for an image data obtained from the other side of the boundary.

16. The image reading apparatus defined in claim 15, wherein the boundary includes a combined boundary obtained by synthesizing boundaries of a plural sections.

17. An image data reading apparatus for generating image data by image reading means in accordance with signals detected by a plurality of reading elements set in arrays on an image reading sensor of a free scanning apparatus able to scan an original in arbitrary direction, said image data corresponding to each reading element, calculating position information corresponding to said each image data by position information generating means according to a moving amount of the free scanning apparatus, and mapping said each image data in image data storage means according to the position information, said apparatus comprising:

first scanning direction detecting means for detecting a scanning direction of the free scanning apparatus in accordance with the position information of both ends of the image reading sensor, first boundary detecting means, where the read starting position represents a reference position, a reading elements arraying direction at the reference position is defined as a Y axis and a direction vertical to the Y axis as a X axis, in accordance with scanning direction signals outputted from the first scanning direction detecting means and the position information of one or both ends of the image reading sensor, when the free scanning apparatus scans in the X positive direction for one section, said means for generating a boundary vertical to at least either one of the X axis or the Y axis within the mapping area, first boundary comparing means, when the free scanning apparatus scans in the X negative direction in accordance with the scanning direction signals, said means for comparing boundary signals outputted the first boundary detecting means and the position information of the image reading sensor, and mapping means, when the image data is mapped on the image data storage in accordance with the position information of the image reading sensor, for determining whether the mapping is performed or not in accordance with comparing signals outputted from the first boundary comparing means.

18. The image data reading apparatus defined in claim 17, wherein the first boundary comparing means compares the boundary signals for a plural sections generated by repeating the scanning and the position information of the image reading sensor.

19. The image data reading apparatus defined in claim 17, wherein the scanning in the negative direction detected by the first scanning direction detecting means includes the moving of one end of the image reading sensor in the X positive direction and the moving of the other end of the image reading sensor in the X negative direction.

20. The image data reading method defined in claim 19, wherein the boundary generated by the boundary detecting means includes a boundary which is generated in vertical to the X axis in accordance with a smaller value of X coordinate of one end of the sensor at the scan starting position in the X negative direction within the one section than the other end.

21. The image data reading method defined in claim 19, wherein a determination of the scanning direction of the free scanning apparatus is performed if the scanning is over a specific moving amount or over a specific time for reading.

22. The image data reading method defined in claim 17, wherein the boundary generated by the boundary detecting means includes a boundary which is generated in vertical to the Y axis in accordance with a minimum value of Y coordinate within the scanning for one section of an end of the sensor having a larger value of Y coordinate at the reference position than the other end.

23. The image data reading method defined in claim 17, wherein the boundary generated by the boundary detecting means includes a boundary which is generated in vertical to the Y axis in accordance with a maximum value of Y coordinate within the scanning for one section of an end of the sensor having a smaller value of Y coordinate at the reference position than the other end.

24. The image data reading method defined in claim 17, wherein the boundary generated by the boundary detecting means includes a boundary which is generated in vertical to the X axis in accordance with a lager value of X coordinate of an end of the sensor at the scan starting position within the one section than the other end.

25. An image data reading apparatus for generating image data by image reading means in accordance with signals detected by a plurality of reading elements set in an array on an image reading sensor of a free scanning apparatus able to scan an original in arbitrary direction, said image data corresponding to each reading element, calculating position information corresponding to said each image data by position information generating means according to a moving amount of the free scanning apparatus, and mapping said each image data in image data storage means according to the position information, said apparatus comprising:

forward direction determining means for determining a forward direction of the free scanning apparatus in accordance with the position information of both ends of the image reading sensor for a specific section, second scanning direction detecting means for detecting a scanning direction of the free scanning apparatus in accordance with the position information of both end of the image reading sensor and forward direction signals outputted from the forward direction determining means, second boundary detecting means, where the read starting position represents a reference position, a reading elements arraying direction at the reference position is defined as a Y axis and a direction vertical to the Y axis as a X axis, in accordance with the forward direction signals, scanning direction signals outputted from the second scanning direction detecting means and the position information of both ends of the image reading sensor, when the scanning apparatus is determined to move for one section in the forward direction, said means for generating a boundary vertical to at least one of the X axis or the Y axis within the mapping area, second boundary comparing means, if the free scanning apparatus is determined to move in reverse direction according to the scanning direction signals, said means for comparing boundary signals outputted from the second boundary detecting means and the position information of the image reading sensor, and mapping means, when the image data is mapped on the image data storage in accordance with the position information of the image reading sensor, for determining whether the mapping is performed or not according to comparing signals outputted from the second boundary comparing means.

26. The image data reading apparatus defined in claim 25, wherein the second boundary comparing means compares boundary signals of a plural sections by repeating the scanning and the position information of the reading sensor.

27. The image data reading apparatus defined in claim 25, wherein the scanning in reverse direction detected by the second scanning direction detecting means includes the moving of one end of the image reading sensor in the X positive direction, and the moving of the other end of the image reading sensor in the X negative direction.

28. An image data reading apparatus for generating image data by image reading means in accordance with signals detected by a plurality of reading elements set in an array on an image reading sensor of a free scanning apparatus able to scan an original in arbitrary direction, said image data corresponding to each reading element, calculating position information corresponding to said each image data by position information generating means according to a moving amount of the free scanning apparatus, and mapping said each image data in image data storage means according to the position information, said apparatus comprising:

slant scanning detecting means for detecting the slant against the reference position of the free scanning apparatus according to the position information of both ends of the image reading sensor, third boundary detecting means, where the read starting position represents a reference position, a reading elements arraying direction at the reference position is defined as a Y axis and a direction vertical to the Y axis as a X axis, in accordance with the position information of both ends of the image reading sensor and slant scanning signals outputted from the slant scanning detecting means, said means for detecting a slant of the free scanning apparatus against the reference position, and generating a boundary vertical to at least one of the X axis or the Y axis within the mapping area for one section when the slant value is under a specific value, third boundary comparing means for comparing boundary signals outputted from the third boundary detecting means and the position information of the image reading sensor in accordance with the slant scanning signals, and mapping means, when the image data is mapped in the image data storage according to the position information of the image reading sensor, said means for determining whether the mapping is performed or not in accordance with comparing signals outputted from the third boundary comparing means.

29. The image data reading apparatus defined in claim 28, wherein the third boundary comparing means compares the boundary signals for a plural sections generated by repeating the scanning and the position information of the image reading sensor.

30. The image data reading apparatus defined in claim 28, wherein the slant scanning signals is generated in accordance with two threshold values.

\* \* \* \* \*

UNITED STATES PATENT AND TRADEMARK OFFICE
CERTIFICATE OF CORRECTION

PATENT NO. : 6,583,895 B1
DATED : June 24, 2003
INVENTOR(S) : Yasuhiro Kuwahara et al.

It is certified that error appears in the above-identified patent and that said Letters Patent is hereby corrected as shown below:

<u>Title page,</u>
Item [57], ABSTRACT, change "the mapping unit 8" to -- the mapping unit 7 --

<u>Column 25,</u>
Line 26, change "lager" to -- larger --

<u>Column 28,</u>
Line 24, change "lager" to -- larger --

Signed and Sealed this

Fifteenth Day of June, 2004

JON W. DUDAS
*Acting Director of the United States Patent and Trademark Office*